(12) United States Patent
Mallavarapu et al.

(10) Patent No.: US 9,199,184 B2
(45) Date of Patent: Dec. 1, 2015

(54) CONTAMINANT SEPARATING METHOD USING A MODIFIED PALYGORSKITE CLAY SORBENT

(75) Inventors: Megharaj Mallavarapu, Panorama (AU); Ravendra Naidu, Pasadena (AU); Yunfei Xi, Paralowle (AU); Binoy Sarkar, Ingle Farm (AU)

(73) Assignee: CRC CARE Pty Ltd, Mawson Lakes (AU)

( * ) Notice: Subject to any disclaimer, the term of this patent is extended or adjusted under 35 U.S.C. 154(b) by 947 days.

(21) Appl. No.: 13/157,054

(22) Filed: Jun. 9, 2011

(65) Prior Publication Data

US 2012/0145639 A1    Jun. 14, 2012

Related U.S. Application Data

(63) Continuation of application No. PCT/AU2009/001596, filed on Dec. 9, 2009.

(51) Int. Cl.
| | |
|---|---|
| B01D 15/00 | (2006.01) |
| B01J 20/10 | (2006.01) |
| B01J 20/16 | (2006.01) |
| B01J 20/32 | (2006.01) |

(Continued)

(52) U.S. Cl.
CPC .................. B01D 15/00 (2013.01); B01J 20/10 (2013.01); B01J 20/16 (2013.01); B01J 20/3248 (2013.01); C01B 33/44 (2013.01); C02F 1/281 (2013.01); C02F 1/288 (2013.01); C02F 2101/103 (2013.01); C02F 2101/106 (2013.01); C02F 2101/16 (2013.01); C02F 2101/22 (2013.01); C02F 2101/306 (2013.01); *C02F 2101/308* (2013.01); *C02F 2101/32* (2013.01); *C02F 2101/345* (2013.01); *C02F 2101/38* (2013.01); *C02F 2209/06* (2013.01); *C02F 2305/04* (2013.01); *Y02W 10/37* (2013.01)

(58) Field of Classification Search
CPC .......... B01D 15/00; C02F 1/281; B01J 20/16; B01J 20/3248; B01J 20/10; C01B 33/44
USPC ............................ 210/690–691, 502.1, 917
See application file for complete search history.

(56) References Cited

U.S. PATENT DOCUMENTS 2,622,987 A * 12/1952 Ratcliffe ..................... 106/31.85
3,198,842 A *  8/1965 Berrigan ....................... 568/780

(Continued)

FOREIGN PATENT DOCUMENTS

| JP | 54-113956 | 9/1979 |
| JP | 62072769 A * | 4/1987 |

(Continued)

OTHER PUBLICATIONS

U.S. Appl. No. 13/514,572, Kambala et al., Office Action dated Feb. 23, 2015.

(Continued)

*Primary Examiner* — Chester Barry

(57) ABSTRACT

The present invention relates to modified clay sorbents which may be used as sorbents for chemical compounds. In addition, the present invention also relates to the use of modified clay sorbents for the sorption of chemical compounds. The modified clay sorbents of the present invention have particular application for the sorption of anionic and/or hydrophobic compounds.

15 Claims, 15 Drawing Sheets

(51) Int. Cl.

| | | |
|---|---|---|
| *C01B 33/44* | (2006.01) | |
| *C02F 1/28* | (2006.01) | |
| C02F 101/10 | (2006.01) | |
| C02F 101/16 | (2006.01) | |
| C02F 101/22 | (2006.01) | |
| C02F 101/30 | (2006.01) | |
| C02F 101/32 | (2006.01) | |
| C02F 101/34 | (2006.01) | |
| C02F 101/38 | (2006.01) | |

(56) References Cited

U.S. PATENT DOCUMENTS

| | | | | |
|---|---|---|---|---|
| 3,443,359 | A | * | 5/1969 | Zerilli et al. ............ 95/88 |
| 3,537,994 | A | * | 11/1970 | House ............ 508/140 |
| 3,594,111 | A | * | 7/1971 | Wittcoff et al. ............ 8/513 |
| 4,079,001 | A | | 3/1978 | Haase et al. |
| 4,386,010 | A | | 5/1983 | Hildebrandt |
| 4,444,665 | A | | 4/1984 | Hildebrandt |
| 4,916,095 | A | | 4/1990 | Fogler et al. |
| 6,080,319 | A | | 6/2000 | Alther |
| 6,261,986 | B1 | * | 7/2001 | Bowman et al. ............ 502/62 |
| 6,503,740 | B1 | | 1/2003 | Alther |
| 2003/0015473 | A1 | * | 1/2003 | Murphy et al. ............ 210/691 |
| 2003/0197305 | A1 | | 10/2003 | Collins |
| 2004/0037894 | A1 | | 2/2004 | Moller et al. |
| 2005/0014905 | A1 | | 1/2005 | Chung et al. |
| 2006/0235128 | A1 | * | 10/2006 | Wang et al. ............ 524/445 |
| 2007/0017453 | A1 | * | 1/2007 | Fritter et al. ............ 119/173 |
| 2007/0238810 | A1 | | 10/2007 | Ellul et al. |
| 2008/0110826 | A1 | * | 5/2008 | Prigione et al. ............ 210/611 |
| 2011/0017198 | A1 | * | 1/2011 | Ebrahimi et al. ............ 126/602 |
| 2011/0269872 | A1 | * | 11/2011 | Nam et al. ............ 523/334 |
| 2013/0023408 | A1 | | 1/2013 | Kambala et al. |

FOREIGN PATENT DOCUMENTS

| | | | |
|---|---|---|---|
| JP | 2004065237 A | * | 3/2004 |
| KR | 20060068163 | | 6/2006 |
| WO | WO 2010/065996 | | 6/2010 |

OTHER PUBLICATIONS

EP Serial No. 09831310.9; CRC Care Pty Ltd; European Search Report dated Jan. 30, 2013.

Huang, et al.; "Adsorption studies of a water soluble dye, Reactive Red MF-3B, using sonication-surfactant-modified attapulgite clay"; Journal of Hazardous Materials, Elsevier, Amsterdam, NL; Apr. 13, 2007; vol. 143, No. 1-2; pp. 541-548, XP022028066, ISSN: 0304-3894, DOI: 10.1016/J.JHAZMAT.2006.09.088.

Sanchez-Martin M, et al.; "Efficiency of different clay minerals modified with a cationic surfactant in the adsorption of pesticides: Influence of clay type and pesticide hydrophobicity"; Applied Clay Science, Elsevier Science, NL; Mar. 1, 2006; vol. 31, No. 3-4; pp. 216-228; XP028055220, ISSN: 0169-1317, DOI: 10.1016/J.Clay. 2005.07.008.

Rodriguez-Cruz, et al.; "Significance of the long-chain organic cation structure in the sorption of the penconazole and metalzxyl fungicides by organo clays"; Journal of Hazardous Materials, Elsevier, Amsterdam, NL ; Mar. 4, 2008; vol. 160, No. 1; pp. 200-207, XP025574135, ISSN 0304-3894,DOI: 10.106/J.JHAZMAT.2008. 02.102.

* cited by examiner (A)

(B)

(C)

CONTAMINANT SEPARATING METHOD USING A MODIFIED PALYGORSKITE CLAY SORBENT

CROSS REFERENCE TO RELATED APPLICATIONS

The present application is a continuation of PCT Application Serial No. PCT/AU2009/001596, filed Dec. 9, 2009, now abandoned; which claims priority to Australian provisional patent application 2008906348, filed Dec. 9, 2008, the content of each being incorporated herein by reference.

BACKGROUND OF THE INVENTION

1. Field of the Invention

The present invention relates to modified clay sorbents which may be used as sorbents for chemical contaminants. In addition, the present invention also relates to the use of modified clay sorbents for the sorption of chemical contaminants.

2. Brief Description of Related Art

The effluents discharged from various industries, such as textile, tannery, paper, printing, food, paints, rubber and plastic, release dyes and other contaminants into the environment. Some contaminants, and/or their biodegradation products, are toxic and potentially carcinogenic. These can deleteriously affect aquatic life in water bodies and damage ecosystems.

Dye contamination of water also inhibits sunlight penetration into water and thus inhibits photosynthesis by aquatic flora. In addition, the appearance of colour in water due to presence of dye compounds may reduce its reuse potential and is also generally aesthetically undesirable.

Decolourisation of dyes which are highly soluble in water is a major problem faced by various industries. Orange II (4-(2-Hydroxy-1-naphthylazo) benzenesulfonic acid sodium) is one such dye extensively used in textile, paper, foodstuffs, hair and leather colouring. Its water solubility may reach up to 116 g/L. This dye is anionic and contains one nitrogen double bonded group (N=N) and one sulfonic acid group ($NaO_3S$). Orange II is non-biodegradable in nature and known to induce cytogenetic changes in animals. It poses potential human health risks and is also a suspected carcinogen.

Several physical, chemical and biological processes have been developed for the removal of dyes and other contaminants in waste water. Among these processes, sorption has been proven to be an effective and attractive mechanism and clays have been used as sorbents for dyes or other contaminants in waste water. Among the clays, bentonite is the most studied material for decolourising dye waste water. Several other modified clay candidates such as pillared clay, acid treated bentonite and sepiolite, surfactant treated sepiolite, layered double hydroxides and spent activated clay have also been investigated.

However, most of the investigated natural aluminosilicate clay minerals are not suitable for the sorption of anionic and/or hydrophobic compounds, including dyes such as Orange II. As such, a need exists for clay-based sorbents which are suitable for contaminants such as anionic and/or hydrophobic contaminants, including dyes such as Orange II.

Reference to any prior art in this specification is not, and should not be taken as, an acknowledgment or any form of suggestion that this prior art forms part of the common general knowledge in any country.

SUMMARY

In a first aspect, the present invention provides a modified clay sorbent comprising a palygorskite clay modified with a cationic surfactant.

The modified palygorskites of the present invention are desirable as sorbents due to their advantageous properties, such as nano-scale fibrous or acicular particle morphology and high initial surface area. These properties are particularly advantageous for sorption of organic contaminants where fast kinetic rates are required for successful application.

In some embodiments, loading of surfactants in amounts equal to (or less than) the CEC of the clay forms a single layer of surfactant on the clay surface, referred to herein as a "surfactant monolayer". In these monolayers, the cationic end of the surfactant molecule aligns toward the clay surface to counter the net negative charge on the clay surface and interlayer region. The outward-facing tails of the attached cationic surfactant extend outward from the clay surface. This renders the surface of the modified clay sorbent hydrophobic which repels water and attracts organic compounds.

In some embodiments, if surfactant in excess of clay CEC is available, the hydrophobic tails of the surfactant on the clay surface interact with the hydrocarbon tails of excess cationic surfactant in solution to form a "surfactant bilayer". The surfactant bilayer is formed by the second layer of surfactant adsorbing on to the first layer by physical interaction between the tails of the surfactant molecules. The cationic end of the surfactant molecules in the second layer of the bilayer is then exposed and is available for binding to anionic compounds. Furthermore, hydrophobic molecules may also interact with and/or absorb into the hydrophobic region formed by the hydrocarbon tails of the cationic surfactants.

In a second aspect, the present invention provides a method for separating a contaminant from a sample containing the contaminant, the method comprising contacting the sample with a modified clay sorbent according to the first aspect of the invention under conditions suitable for sorption of the contaminant to the modified clay sorbent.

"Separating" a contaminant from a sample containing the contaminant should be understood to include any reduction of the amount of contaminant in the sample after contact with the modified clay sorbent relative to the amount of contaminant in the sample prior to contacting the sample with the modified clay sorbent. As set out above, separation of a contaminant from a sample is effected by sorption of the contaminant in the sample to the modified clay sorbent thus immobilising the contaminant on the sorbent and removing it from the sample. In light of the above, separating a contaminant from a sample may include complete or partial separation between the contaminant and sample.

The sample for use in accordance with the second aspect of the invention may be any sample which contains a contaminant. When the contaminant is an environmental contaminant (e.g., a dye), the sample may be an environmental sample such as a water sample, a soil dilution sample, a gaseous or atmospheric sample and the like. In some embodiments, the sample may be an effluent sample from industry including liquid effluents such as wastewater or gaseous effluents. In further embodiments, the sample may be environmental water or air for which the removal or one or more contaminants is desirable. For example, the modified clay sorbent may be incorporated into air filters or water filters to produce air or water for human or animal consumption.

The present method contemplates sorption of any suitable contaminant that binds to a modified clay sorbent according to the first aspect of the invention.

In some embodiments, the contaminant is an anionic contaminant. In this case, sorption of the anionic contaminant may occur via ionic bonding or other association of the anionic contaminant with the positively charged cationic head groups of the cationic surfactant in the modified clay sorbent.

In further embodiments, the contaminant is a hydrophobic contaminant. In these embodiments, sorption between the hydrophobic contaminant and the modified clay sorbent may occur through adsorption or absorption of the hydrophobic contaminant to the hydrophobic tail groups of the cationic surfactant in the modified clay sorbent.

The modified clay sorbents of the present invention have particular application for the sorption of anionic organic dyes. An exemplary group of contaminants includes "azo compounds", including azo dye compounds. In further specific embodiments, the azo dye may be Orange II (4-(2-Hydroxy-1-naphthylazo) benzenesulfonic acid sodium).

In some embodiments, the modified clay sorbents of the present invention have particular application for the sorption of hydrophobic phenoxy compounds, including phenoxy herbicides such as 2,4-Dichlorophenoxyacetic acid (2,4-D) and the like.

In some embodiments, the modified clay sorbents of the present invention also have application for the sorption of ionisable organic compounds and/or nitrophenol compounds such as 4-nitrophenol.

BRIEF DESCRIPTION OF THE DRAWINGS

FIG. 2: Freundlich plots for the adsorption of PNP onto modified clay sorbents DP1 and DP2 (0.3 g sorbent, 30 mL of PNP solution, 23° C. temperature, agitation time 2 hours)

DETAILED DESCRIPTION OF EXEMPLARY EMBODIMENTS

Figure 1:
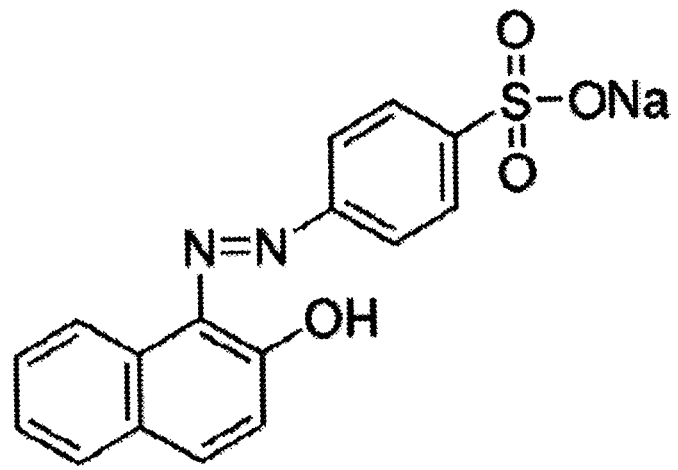
FIG. 1 shows exemplary molecular structures of Orange II (A) DMDOA (B) and ODTMA (C).
Figure 1:
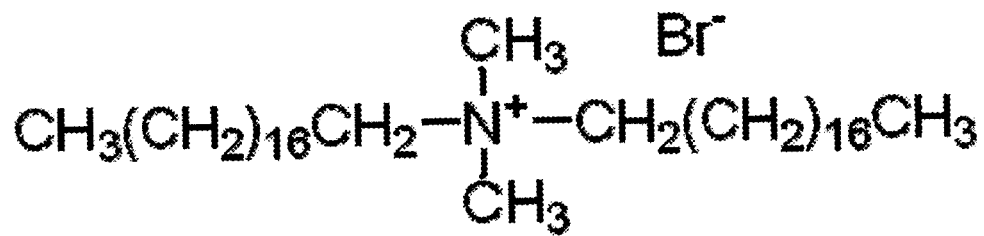
Figure 1:
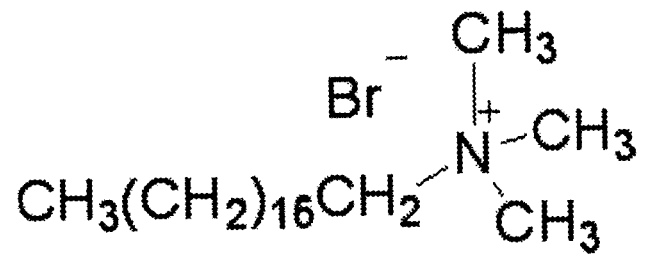

It is to be understood that the following description is for the purpose of describing particular embodiments only and is not intended to be limiting with respect to the above description.

In a first aspect, the present invention provides a modified clay sorbent comprising a palygorskite clay modified with a cationic surfactant.

As set out above, the present invention contemplates a modified clay sorbent. The sorbents of the present invention should be understood as agents which can bind, immobilise, or otherwise associate with a contaminant via sorption of the contaminant to the modified clay sorbent. "Sorption" as referred to herein should be understood to include adsorption of the contaminant to the surface of the sorbent and/or absorption of the contaminant into all or part of the sorbent.

The modified clay sorbents of the present invention may also be referred to herein as "modified palygorskites" and such terms are used interchangeably.

Palygorskite (also known as attapulgite) is a magnesium aluminium phyllosilicate of the formula $(Mg,Al)_2Si_4O_{10}(OH).4(H_2O)$. Palygorskites are 2:1 clay minerals. The structure of palygorskite contains continuous planes of Si tetrahedra. The apical oxygens point alternately up and down relative to the basal oxygen plane so the structure has a chain-like characteristic.

Palygorskites have fibrous particle morphology comprising crystals elongated along the a-axis. The length of the individual fibres may vary from <1 μm to about 20 μm and have a diameter from about 0.1 to about 0.5 μm. The fibres may consist of aggregates of 10 to 35 nm wide and 5 to 10 nm thick laths in parallel orientation. Distinct striations of width varying from 4.5 to 5.0 nm have been observed along the fibre length.

The fine particle size, fibrous particle shape and internal channel of palygorskites result in them having the highest surface area among the clay minerals. Total surface area calculated from theoretical models is about 800 to 900 $m^2/g$. Experimental surface areas, however, tend to be significantly lower due to inability of experimental procedures to measure wedge shaped voids. Furthermore, not all of the theoretical surface area is available for sorption.

Palygorskites exhibit cation exchange capacity, which is primarily due to limited isomorphous substitution of Si by Al in the tetrahedral sheet.

Palygorskites are desirable as sorbents due to their advantageous properties, such as nano-scale fibrous or acicular particle morphology and high initial surface area. These properties are particularly advantageous for sorption of organic contaminants where fast kinetic rates are required for successful application.

However, the surface of unmodified palygorskites is generally hydrophilic due to the nature of surface atomic planes and exchangeable cations. In aqueous systems, water is preferentially and strongly adsorbed onto the palygorskite surface. As a consequence, hydrophobic organic compounds are generally unable to access the palygorskite surface for sorption.

As set out above, the present invention provides a modified clay sorbent comprising a palygorskite clay "modified with"

a cationic surfactant. Modification of palygorskite clays with a cationic surfactant enables sorption of anionic and/or hydrophobic compounds by the resultant modified clay sorbent.

In the modified clay sorbents of the present invention, the clay surface may be modified by exchanging the native cations in a palygorskite with the cationic surfactant.

Methods for cation exchange of clays are well known in the art and the present invention contemplates any such methods to produce the modified clay sorbents described herein. However, by way of example, reference is made to Frost et al. (*Spectrochimica Acta, Part A: Molecular and Biomolecular Spectroscopy* 69A(1): 239-244, 2008).

In some embodiments, loading of surfactants in amounts equal to (or less than) the CEC of the clay forms a single layer of surfactant on the clay surface, referred to herein as a "surfactant monolayer". In these monolayers, the cationic end of the surfactant molecule aligns toward the clay surface to counter the net negative charge on the clay surface and interlayer region. The outward-facing tails of the attached cationic surfactant extend outward from the clay surface. This renders the surface of the modified clay sorbent hydrophobic which repels water and attracts organic compounds.

Thus, in some embodiments, the cationic surfactant is present as a surfactant monolayer on at least part of the palygorskite surface.

In some embodiments, if surfactant in excess of clay CEC is available, the hydrophobic tails of the surfactant on the clay surface interact with the hydrocarbon tails of excess cationic surfactant in solution to form a "surfactant bilayer". The surfactant bilayer is formed by the second layer of surfactant adsorbing on to the first layer by physical interaction between the tails of the surfactant molecules. The cationic end of the surfactant molecules in the second layer of the bilayer is then exposed and is available for binding to anionic compounds. Furthermore, hydrophobic molecules may also interact with and/or absorb into the hydrophobic region formed by the hydrocarbon tails of the cationic surfactants.

Thus, in some embodiments, the cationic surfactant is present as a surfactant bilayer on at least part of the palygorskite surface.

The cationic surfactant in the modified clay sorbent may be any suitable cationic surfactant.

As referred to herein, the term "cationic surfactant" refers to any surfactant molecule comprising a hydrophobic "tail" group and a hydrophilic "head" group, wherein the hydrophilic head group comprises a positive charge.

In some embodiments, the cationic surfactant comprises a quaternary ammonium cation as the head group. "Quaternary ammonium cations" are positively charged ions of the structure:

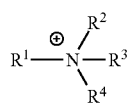

(I)

wherein each of $R^1$, $R^2$, $R^3$ and $R^4$ are independently selected from H, alkyl or aryl groups, with the proviso that at least one of $R^1$, $R^2$, $R^3$ and $R^4$ comprises a hydrophobic alkyl or aryl group.

"Alkyl" as a group or part of a group denotes an optionally substituted straight or branched aliphatic hydrocarbon group. The group may be a terminal group or a bridging group.

"Aryl" as a group or part of a group denotes (i) an optionally substituted monocyclic, or fused polycyclic, aromatic carbocycle (ring structure having ring atoms that are all carbon) preferably having from 5 to 18 atoms per ring. Examples of aryl groups include optionally substituted phenyl, optionally substituted naphthyl, and the like; (ii) an optionally substituted partially saturated bicyclic aromatic carbocyclic moiety in which a phenyl and a $C_{5-7}$ cycloalkyl or $C_{5-7}$ cycloalkenyl group are fused together to form a cyclic structure, such as tetrahydronaphthyl, indenyl or indanyl.

The term "optionally substituted" as used throughout the specification denotes that the group may or may not be further substituted or fused with one or more non-hydrogen substituent groups. In certain embodiments the substituent groups are one or more groups independently selected from the group consisting of: halogen, =O, =S, —CN, —NO₂, —CF₃, —OCF₃, alkyl, alkenyl, alkynyl, haloalkyl, haloalkenyl, haloalkynyl, heteroalkyl, cycloalkyl, cycloalkenyl, heterocycloalkyl, heterocycloalkenyl, aryl, heteroaryl, cycloalkylalkyl, heterocycloalkylalkyl, heteroarylalkyl, arylalkyl, cycloalkylalkenyl, heterocycloalkylalkenyl, arylalkenyl, heteroarylalkenyl, cycloalkylheteroalkyl, heterocycloalkylheteroalkyl, arylheteroalkyl, heteroarylheteroalkyl, hydroxy, hydroxyalkyl, alkyloxy, alkyloxyalkyl, alkyloxycycloalkyl, alkyloxyheterocycloalkyl, alkyloxyaryl, alkyloxyheteroaryl, alkyloxycarbonyl, alkylaminocarbonyl, alkenyloxy, alkynyloxy, cycloalkyloxy, cycloalkenyloxy, heterocycloalkyloxy, heterocycloalkenyloxy, aryloxy, phenoxy, benzyloxy, heteroaryloxy, arylalkyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, alkylsulfinyl, arylsulfinyl, aminosulfinylaminoalkyl, —C(=O)OH, —C(=O)R$^a$, —C(=O)OR$^a$, C(=O)NR$^a$R$^b$, C(=NOH)R$^a$, C(=NR$^a$)NR$^b$R$^c$, NR$^a$R$^b$, NR$^a$C(=O)R$^b$, NR$^a$C(=O)OR$^b$, NR$^a$C(=O)NR$^b$R$^c$, NR$^a$C(=NR$^b$)NR$^c$R$^d$, NR$^a$SO₂R$^b$, —SR$^a$, SO₂NR$^a$R$^b$, —OR$^a$, OC(=O)NR$^a$R$^b$, OC(=O)R$^a$ and acyl, wherein R$^a$, R$^b$, R$^c$ and R$^d$ are each independently selected from the group consisting of H, $C_1$-$C_{12}$alkyl, $C_1$-$C_{12}$haloalkyl, $C_2$-$C_{12}$alkenyl, $C_2$-$C_{12}$alkynyl, $C_2$-$C_{10}$ heteroalkyl, $C_3$-$C_{12}$cycloalkyl, $C_3$-$C_{12}$cycloalkenyl, $C_2$-$C_{12}$heterocycloalkyl, $C_2$-$C_{12}$heterocycloalkenyl, $C_6$-$C_{18}$aryl, $C_1$-$C_{18}$heteroaryl, and acyl, or any two or more of R$^a$, R$^b$, R$^c$ and R$^d$, when taken together with the atoms to which they are attached form a heterocyclic ring system with 3 to 12 ring atoms.

In some embodiments each optional substituent is independently selected from the group consisting of: halogen, =O, =S, —CN, —NO₂, —CF₃, —OCF₃, alkyl, alkenyl, alkynyl, haloalkyl, haloalkenyl, haloalkynyl, heteroalkyl, cycloalkyl, cycloalkenyl, heterocycloalkyl, heterocycloalkenyl, aryl, heteroaryl, hydroxy, hydroxyalkyl, alkyloxy, alkyloxyalkyl, alkyloxyaryl, alkyloxyheteroaryl, alkenyloxy, alkynyloxy, cycloalkyloxy, cycloalkenyloxy, heterocycloalkyloxy, heterocycloalkenyloxy, aryloxy, heteroaryloxy, arylalkyl, heteroarylalkyl, arylalkyloxy, amino, alkylamino, acylamino, aminoalkyl, arylamino, sulfonyl, alkylsulfonyl, arylsulfonyl, aminosulfonyl, aminoalkyl, —COOH, —SH, and acyl.

In some embodiments, at least one, at least two, at least three or each of $R^1$, $R^2$, $R^3$ and $R^4$ is alkyl.

Quaternary ammonium cations may be permanently charged, independent of the pH of their solution.

Quaternary ammonium salts or quaternary ammonium compounds as referred to herein may include salts of quaternary ammonium cations with an anion.

As set out above, cationic surfactants, including those comprising a quaternary ammonium cation, include one or more hydrocarbon tail groups. Typically, the hydrocarbon tail is of sufficient length to be lipophilic or hydrophobic. In some embodiments, the one or more hydrocarbon tail groups of the cationic surfactant, ie. one or more of $R^1$, $R^2$, $R^3$ and $R^4$ in structure (I), may comprise an alkyl chain at least 8, 9, 10, 11, 12, 13, 14, 15, 16, 17, 18, 19 or 20 carbons in length.

In some specific embodiments, the one or more hydrocarbon tail groups comprise an octadecyl (e.g., 18 carbon) alkyl chain.

In some specific embodiments, the cationic surfactant comprises an octadecyltrimethylammonium cation or a salt thereof.

In some specific embodiments, the cationic surfactant comprises a dimethyldioctadecylammonium cation or a salt thereof.

In a second aspect, the present invention provides a method for separating a contaminant from a sample containing the contaminant, the method comprising contacting the sample with a modified clay sorbent according to the first aspect of the invention under conditions suitable for sorption of the contaminant to the modified clay sorbent.

"Separating" a contaminant from a sample containing the contaminant should be understood to include any reduction of the amount of contaminant in the sample after contact with the modified clay sorbent relative to the amount of contaminant in the sample prior to contacting the sample with the modified clay sorbent. As set out above, separation of a contaminant from a sample is effected by sorption of the contaminant in the sample to the modified clay sorbent thus immobilising the contaminant on the sorbent and removing it from the sample. In light of the above separating a contaminant from a sample may include complete or partial separation between the contaminant and sample.

The sample for use in accordance with the second aspect of the invention may be any sample which contains a contaminant to be removed. When the contaminant is an environmental contaminant (e.g., a dye), the sample may be an environmental sample such as a water sample, a soil dilution sample, a gaseous or atmospheric sample and the like.

In some embodiments the sample may be an effluent sample from industry including liquid effluents such as wastewater or gaseous effluents.

Alternatively, the sample may be environmental water or air for which the removal or one or more contaminants is desirable. For example, the modified clay sorbent may be incorporated into air filters or water filters to produce air or water for human or animal consumption or industrial or agricultural use.

The sample may also be an industrial or laboratory sample for which the removal of a particular contaminant (for example as described hereafter) is desirable.

In light of the foregoing, the sample may be contacted with the modified clay sorbent in any suitable manner.

For example, in some embodiments, an effective amount of the modified clay sorbent may be stirred in a settling tank or other reaction vessel or structure into which an effluent containing a contaminant (such as an industrial effluent) may be pumped. In the vessel, the effluent may be contacted with the modified clay sorbent and sorption of the contaminant to the modified clay sorbent may occur. Following sorption of the contaminant by the modified clay sorbent, the modified clay sorbent with associated contaminant may be separated from the remaining liquid (now having a reduced level of contaminant) by any suitable means, such as flocculation, filtration, sedimentation, centrifugation or the like.

In further embodiments, a liquid sample may be introduced into and/or pumped through one or more reactors, fluidized beds, columns, filters or landfills containing the modified clay sorbent such that outlet liquid from the above structures will have reduced contaminant concentration due to sorption of the contaminant by the modified clay sorbent in the structure.

The above structures housing the modified clay sorbent may be on a large scale such as for the treatment of industrial effluents or may be on a smaller scale such as respirator filters, personal or domestic water filters and the like.

After sorption of a contaminant by the modified clay sorbent, the modified clay sorbent may be disposed of or, alternatively, the contaminant may be desorbed from the modified clay sorbent and the modified clay sorbent may then be reused. An example of a suitable desorption method includes the method described by Cao et al. (*J. Hazard. Mater.*, doi: 10.1016/j.jhazmat.2008.05.102, 2008).

The present method contemplates sorption of any suitable contaminant that binds to a modified clay sorbent according to the first aspect of the invention.

In some embodiments, the contaminant is an anionic contaminant. In this case, sorption of the anionic contaminant may occur via ionic bonding or other association of the anionic contaminant with the positively charged cationic head groups of the cationic surfactant in the modified clay sorbent.

Examples of anionic contaminants which may be adsorbed or absorbed include inorganic anions such as nitrate, nitrite, arsenate, chromate, selenate, antimonite, ferricyanide and the like as well as organic anionic contaminants such as anionic herbicides, pesticides and dyes.

In further embodiments, the contaminant is a hydrophobic contaminant. In these embodiments, sorption between the hydrophobic contaminant and the modified clay sorbent may occur through adsorption or absorption of the hydrophobic contaminant to the hydrophobic tail groups of the cationic surfactant in the modified clay sorbent.

Examples of hydrophobic contaminants which may be adsorbed or absorbed using the modified clay sorbents of the present invention include, for example, hydrocarbons, substituted hydrocarbons, perfluorinated hydrocarbons, phenol, phenol derivatives, paranitrophenol, BTEX (such as benzene, toluene, ethylbenzene and xylenes), surfactants, for example, SDS, LAS and perfluorinated surfactants such as PFOS and PFOA, and the like.

In some embodiments, the modified clay sorbents of the present invention have particular application for the sorption of hydrophobic phenoxy compounds, including phenoxy herbicides. Reference herein to a "phenoxy compound" should be understood to include the phenoxyacetic, phenoxybutyric and phenoxypropionic subtypes, the latter group containing the aryloxyphenoxypropionic subtype, which contains the greatest number of commercially available variants. In addition, reference to a "phenoxy compound" should also be understood to include the acid, ester and/or salt forms of phenoxy compounds or herbicides. Examples of phenoxy herbicides include: 2,4-Dichlorophenoxyacetic acid (2,4-D), 2,4,5-Trichlorophenoxyacetic acid (2,4,5-T), 2-Methyl-4-chlorophenoxyacetic acid (MCPA), 2-(2-Methyl-4-chlorophenoxy)propionic acids (mecoprop, MCPP), 2-(2,4-Dichlorophenoxy)propionic acid (dichloroprop, 2,4-DP), (2,4-Dichlorophenoxy)butyric acid (2,4-DB), and the like.

In some embodiments, the modified clay sorbents of the present invention have particular application for the sorption of anionic organic dyes. As such, in some embodiments the contaminant may be an anionic organic dye.

An exemplary group of contaminants includes "azo compounds", including azo dye compounds. Azo compounds include compounds comprising the general structure of:

wherein $R^1$ and $R^2$ are independently selected from either aryl or alkyl.

"Aryl" as a group or part of a group denotes (i) an optionally substituted monocyclic, or fused polycyclic, aromatic carbocycle (ring structure having ring atoms that are all carbon) preferably having from 5 to 18 atoms per ring. Examples of aryl groups include optionally substituted phenyl, optionally substituted naphthyl, and the like; (ii) an optionally substituted partially saturated bicyclic aromatic carbocyclic moiety in which a phenyl and a $C_{5-7}$ cycloalkyl or $C_{5-7}$ cycloalkenyl group are fused together to form a cyclic structure, such as tetrahydronaphthyl, indenyl or indanyl.

The term "optionally substituted" as used throughout the specification denotes that the group may or may not be further substituted or fused (so as to form a condensed polycyclic system), with one or more non-hydrogen substituent groups. In certain embodiments the substituent groups are one or more groups independently selected from the group consisting of halogen, $=O$, $=S$, $-CN$, $-NO_2$, $-CF_3$, $-OCF_3$, alkyl, alkenyl, alkynyl, haloalkyl, haloalkenyl, haloalkynyl, heteroalkyl, cycloalkyl, cycloalkenyl, heterocycloalkyl, heterocycloalkenyl, aryl, heteroaryl, cycloalkylalkyl, heterocycloalkylalkyl, heteroarylalkyl, arylalkyl, cycloalkylalkenyl, heterocycloalkylalkenyl, arylalkenyl, heteroarylalkenyl, cycloalkylheteroalkyl, heterocycloalkylheteroalkyl, arylheteroalkyl, heteroarylheteroalkyl, hydroxy, hydroxyalkyl, alkyloxy, alkyloxyalkyl, alkyloxycycloalkyl, alkyloxyheterocycloalkyl, alkyloxyaryl, alkyloxyheteroaryl, alkyloxycarbonyl, alkylaminocarbonyl, alkenyloxy, alkynyloxy, cycloalkyloxy, cycloalkenyloxy, heterocycloalkyloxy, heterocycloalkenyloxy, aryloxy, phenoxy, benzyloxy, heteroaryloxy, arylalkyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, alkylsulfinyl, arylsulfinyl, aminosulfinylaminoalkyl, $-C(=O)OH$, $-C(=O)R^a$, $-C(=O)OR^a$, $C(=O)NR^aR^b$, $C(=NOH)R^a$, $C(=NR^a)NR^bR^c$, $NR^aR^b$, $NR^aC(=O)R^b$, $NR^aC(=O)OR^b$, $NR^aC(=O)NR^bR^c$, $NR^aC(=NR^b)NR^cR^d$, $NR^aSO_2R^b$, $-SR^a$, $SO_2NR^aR^b$, $-OR^a$, $OC(=O)NR^aR^b$, $OC(=O)R^a$ and acyl, wherein $R^a$, $R^b$, $R^c$ and $R^d$ are each independently selected from the group consisting of H, $C_1$-$C_{12}$alkyl, $C_1$-$C_{12}$haloalkyl, $C_2$-$C_{12}$alkenyl, $C_2$-$C_{12}$alkynyl, $C_2$-$C_{10}$ heteroalkyl, $C_3$-$C_{12}$cycloalkyl, $C_3$-$C_{12}$cycloalkenyl, $C_2$-$C_{12}$heterocycloalkyl, $C_2$-$C_{12}$heterocycloalkenyl, $C_6$-$C_{18}$aryl, $C_1$-$C_{18}$heteroaryl, and acyl, or any two or more of $R^a$, $R^b$, $R^c$ and $R^d$, when taken together with the atoms to which they are attached form a heterocyclic ring system with 3 to 12 ring atoms.

In some embodiments each optional substituent is independently selected from the group consisting of: halogen, $=O$, $=S$, $-CN$, $-NO_2$, $-CF_3$, $-OCF_3$, alkyl, alkenyl, alkynyl, haloalkyl, haloalkenyl, haloalkynyl, heteroalkyl, cycloalkyl, cycloalkenyl, heterocycloalkyl, heterocycloalkenyl, aryl, heteroaryl, hydroxy, hydroxyalkyl, alkyloxy, alkyloxyalkyl, alkyloxyaryl, alkyloxyheteroaryl, alkenyloxy, alkynyloxy, cycloalkyloxy, cycloalkenyloxy, heterocycloalkyloxy, heterocycloalkenyloxy, aryloxy, heteroaryloxy, arylalkyl, heteroarylalkyl, arylalkyloxy, amino, alkylamino, acylamino, aminoalkyl, arylamino, sulfonyl, alkylsulfonyl, arylsulfonyl, aminosulfonyl, aminoalkyl, $-COOH$, $-SH$, and acyl.

Aryl azo compounds are usually stable, crystalline species. Azobenzene is the prototypical aromatic azo compound. It exists mainly as the trans isomer, but upon photolysis, converts to the cis isomer.

As a consequence of n-delocalization, aryl azo compounds typically have vivid colours, especially reds, oranges, and yellows. These compounds may be referred to as "azo dyes" and include, for example, Orange II, Disperse Orange 1, Sudan I, Sudan II, Sudan III, Sudan IV; methyl orange, methyl red, methyl yellow; Congo red; Sunset Yellow FCF; Orange G and Acid red, among others.

Most azo dyes contain only one azo group, but may contain two azo groups (disazo), three azo groups (trisazo) or more.

In addition, the terms "azo compound" or "azo dye" should be understood to include corresponding tautomers of azo compounds or azo dyes.

Thus, in some embodiments, the contaminant may be an azo dye. In some embodiments, the azo dye may be Orange II (4-(2-Hydroxy-1-naphthylazo) benzenesulfonic acid sodium).

Aliphatic azo compounds (where $R^1$ and/or $R^2$ are alkyl groups) are less commonly encountered than the aryl azo compounds. One example is diethyldiazene, EtN=NEt. At elevated temperatures or upon irradiation, the carbon-nitrogen (C—N) bonds in certain alkyl azo compounds cleave with the loss of nitrogen gas to generate radicals. Owing to this process, some aliphatic azo compounds are utilized as radical initiators. Representative is Azobisisobutylonitrile (AIBN) which is widely used as an initiator in polymerization.

In some embodiments, the contaminant may also comprise an ionisable organic contaminant.

It has been usually challenging to remediate ionisable organic contaminants through adsorption because these compounds are subjected to protonation or deprotonation depending on the pH of the aqueous phase. The majority of studies in adsorptive remediation of organic contaminants by organoclays has concentrated on nonionic organic compounds where the contaminants are adsorbed mainly through a partitioning mechanism. However, removal of ionisable compounds by organoclays might be governed by multiple mechanisms, namely electrostatic attraction, partitioning, ion exchange, van der Waals forces and the like.

As set out in the examples, the adsorption of 4-nitrophenol (PNP), as a model ionisable organic compound, by the modified clay sorbents of the present invention has been demonstrated.

PNP itself is an important member of the nitro aromatic phenolic compounds. It has intensive application in pesticides, dyes and pigments, polymer engineering, olive processing, petrochemicals and pharmaceutical industries. It is listed among the 126 priority pollutants by the US EPA. It is toxic to plants, animal and human health. In case of acute exposure PNP is known to cause blood disorder (methenoglobinemia), liver and kidney failure, anemia, skin and eye irritation and systemic poisoning. Thus, due to the toxicity and environmental damage caused by PNP, it is necessary to develop effective remediation approach for safe discharge of the industry effluents containing this compound.

Accordingly, in some embodiments, the contaminant may also be a nitrophenol compound. In some embodiments the contaminant may be 4-nitrophenol.

As set out above, a sample is contacted with a modified clay sorbent according to the first aspect of the invention "under conditions suitable for sorption of the contaminant to the modified clay sorbent". Such conditions include suitable concentrations of the sample and modified clay sorbent, suitable temperature, suitable pressure, suitable pH and the like. In general, these could be determined by a person skilled in the art for any combination of contaminant and modified clay sorbent.

In some embodiments of the invention, including those wherein the contaminant is Orange II, the conditions suitable for sorption of the contaminant to the modified clay sorbent comprise a pH selected from: less than 13, less than 12, less than 11, or less than 10.

EXAMPLE 1

Materials and Preparation

An Australian palygorskite (Grade 050F) was supplied by Hudson Resource Limited. This clay originates from Western Australia and was used as received without further purification. The cation exchange capacity (CEC) of this clay is 17.0 meq/100 g as determined by the ammonia electrode method (Borden and Giese, *Clays and Clay Minerals* 49(5): 444-445, 2001). It has a specific surface area of 97.3 m²/g as measured by the BET method on a Gemini 2380 surface analyser.

The surfactants selected for this study were octadecyltrimethylammonium bromide ($C_{21}H_{46}NBr$, FW: 392.52, denoted as ODTMA) and dimethyldioctadecylammonium bromide ($C_{38}H_{80}BrN$, MW: 630.95, denoted as DMDOA) as supplied by Sigma-Aldrich.

Orange II (4-(2-Hydroxy-1-naphthylazo) benzenesulfonic acid sodium, denoted as OII, ($C_{16}H_{11}N_2NaO_4S$, MW: 350.33) was obtained from Sigma-Aldrich and all these chemicals were used without any purification.

The molecular structures of OII, ODTMA and DMDOA are illustrated in FIG. 1.

Syntheses of modified clay sorbents were undertaken using a similar procedure described previously (Frost et al., *Spectrochimica Acta, Part A: Molecular and Biomolecular Spectroscopy* 69A(1): 239-244, 2008): the clarifying surfactant solution was obtained by adding certain amount of surfactants into hot distilled water. Then a certain amount of palygorskite was added into that solution and the mixture was stirred slightly avoiding yield of excess spume in an 80° C. water bath for 5 hours. The water/clay mass ratio was 10. All of the modified clay sorbents were washed free of bromide anions as determined by $AgNO_3$ test, dried in an oven at 60° C. (S.E.M. Pty Ltd, South Australia), ground in agate mortar and stored in a vacuum desiccator before use. The ODTMA and DODMA modified palygorskites prepared at the concentration of 1 CEC and 2 CEC were denoted as OP1CEC, OP2CEC, DP1CEC and DP2CEC, respectively.

Because of the reliability and simplicity of a batch model, adsorption experiments were conducted by a batch technique at certain temperatures (18° C., 25° C. or 37° C. in constant temperature rooms). Sorbent material was placed in a 50 mL centrifuge tube containing 40 mL of OII solution of known concentration and pH (measured with an Orion 3 star pH meter from Thermo Electron Corporation). The solutions were shaken for certain period of time on a rotating shaker (RATELC Instrument Pty LTD, Vic, Australia). The sorbent was separated by centrifugation at 4000 rpm for 15 minutes (Multifuge 3 S—R, Hevaeus, Kendo Laboratory Products, Germany). Dye concentrations in the supernatant liquid were determined spectrophotometrically on an Agilent 8453 UV-VIS Spectroscopy system by measuring absorbance at $k_{max}$ of 485 nm for OII. The amount of OII sorbed by clay/modified clay sorbents was calculated from the difference between the initial and final/equilibrium solution concentrations; solid-phase loading of OII, $q_e$ (mg/g) was computed from the mass balance: $q_e = V(C_i - C_e)/M$; where, $C_i$ and $C_e$ are total dissolved and equilibrium liquid phase concentration (mg/L), respectively, and M is the dose of sorbent (g/L), V is the volume of the solution (mL). All working solutions were prepared from OII stock solution diluted with MilliQ water and all experiments were carried out in duplicate.

EXAMPLE 2

Characterisation Methods (i) X-Ray Diffraction (XRD)

Unmodified palygorskite and the modified clay sorbents were pressed in stainless steel sample holders. X-ray diffraction (XRD) patterns were recorded using CuKα radiation (n=1.5418 Å) on a Panalytical X'Pert (PW3040) diffractometer operating at 40 kV and 50 mA between 1 and 65° (2θ) at a step size of 0.0167°.

(ii) Infrared Spectroscopy (IR)

Infrared (IR) spectra were obtained using a Magna-IR™ spectrometer 750 (Nicolet Instrument Corp. USA) equipped with a liquid nitrogen cooled mercury-cadmium-telluride (MCT) detector and DRIFT (Diffuse Reflectance Infra-red Fourier Transform) accessories. Spectra over the 4000-400 cm⁻¹ range were obtained by the co-addition of 64 scans with a resolution of 4 cm⁻¹ and a mirror velocity of 0.6329 cm/s. Peakfit software package (AISN Software Inc.) was used to undertake band component analysis that enabled the type of fitting function to be selected and allowed specific parameters to be fixed or varied accordingly. Gauss-Lorentz cross-product function with the minimum number of component bands was used for band fitting. The fitting was undertaken until reproducible results were obtained with squared correlations ($r^2$) of greater than 0.98.

(iii) Scanning Electron Microscopy (SEM)

A Philips XL30 FEG scanning electron microscope (SEM) with EDAX DX4 integrated energy dispersive X-ray analyser system was used for morphological studies. Palygorskite and the surfactant modified products were dried at room temperature and coated with carbon for the SEM studies.

(iv) Surface Analysing

Adsorption and desorption experiments using $N_2$ were carried out at 77K on a Gemini 2380 surface analyser. Prior to each measurement, the samples were degassed at 353K for 24 hours. The $N_2$ isotherms were used to calculate the specific surface area (SA) and the surface area was determined using multipoint BET method. The porous structure characteristics including pore size and pore volume could be evaluated from the conventional analysis of the nitrogen isotherms.

EXAMPLE 3

X-Ray Diffraction (XRD)

Figure 2:
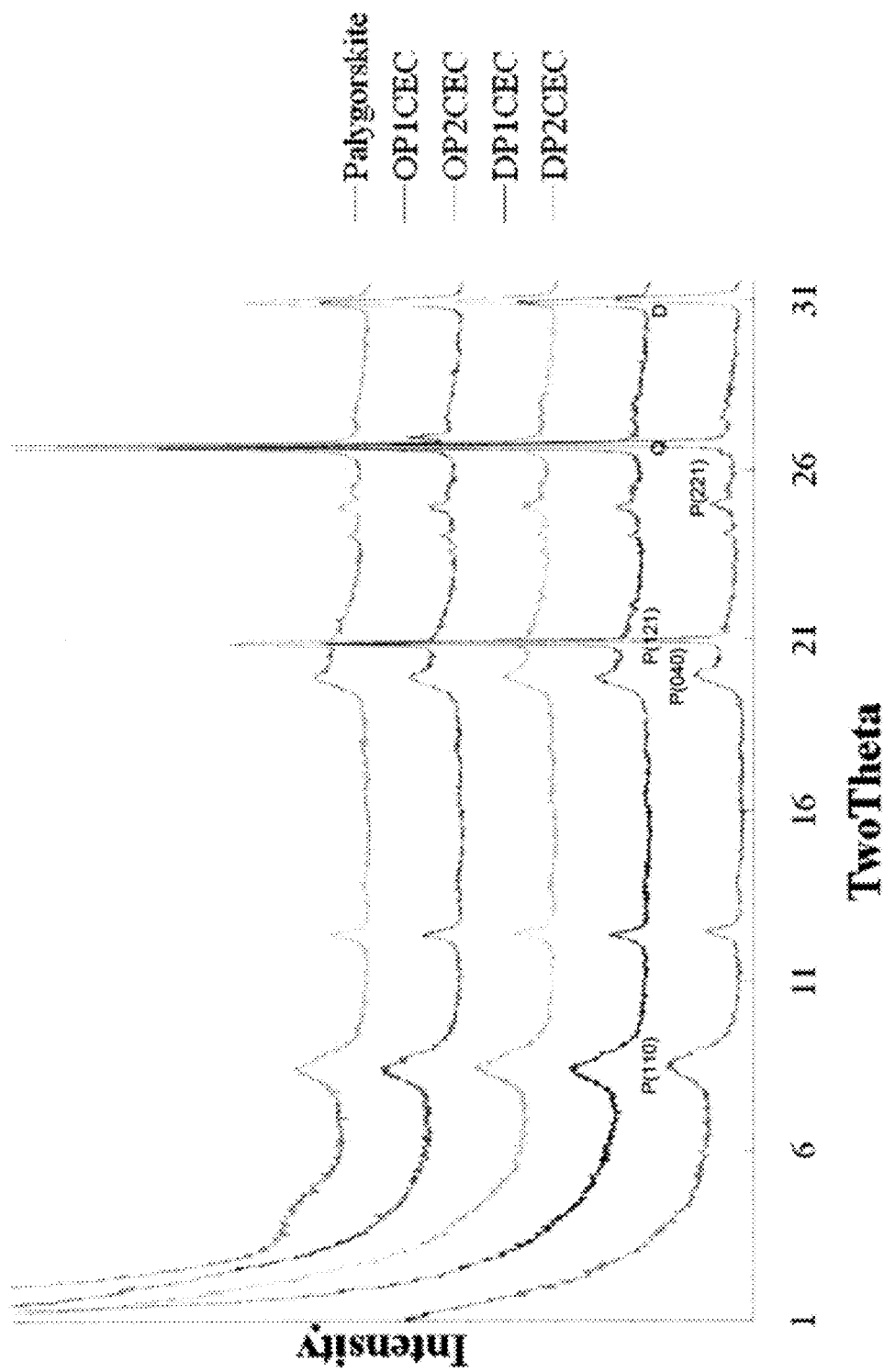
FIG. 2 shows the X-ray diffraction patterns of palygorskite and organic surfactant-modified palygorskites.

FIG. 2 shows the XRD patterns of the untreated and surfactant treated palygorskite. In case of untreated clay, the peak observed at 10.34 Å (2θ=8.55°) is attributed to the (110) plane. In addition, the relatively strong peaks at 4.24 Å (2θ=20.96°), 4.43 Å (2θ=20.04°) and 3.69 Å (2θ=24.12°) represent the '040', '121' and '221' planes, respectively. The peak at 7.10 Å (2θ=12.46°) corresponds to hydrated oxide containing sodium and magnesium cations, while the most intense peak at 3.34 Å (2θ=26.7°) is from quartz impurity.

Other impurities present in the palygorskite used in this study, as revealed from XRD analysis, are dolomite and illite. On the other hand, the XRD patterns of the surfactant modified palygorskites (FIG. 2) are characterised by reflections at 10.49-10.51 Å, 4.46-4.47 Å, 4.24-4.25 Å and 3.70 Å for '110', '121', '040' and '221' planes, respectively, showing almost similar patterns as that of untreated palygorskite. Compared with untreated palygorskite, there is slight changes in the 2θ position of the (110) plane of surfactant modified palygorskites. For instance, OP1CEC, OP2CEC, DP1CEC and DP2CEC show corresponding reflections at 10.49 Å, 10.53 Å, 10.55 Å and 10.51 Å, respectively. Three "diagnostic regions" 4.0-4.5 Å, 3.05-3.3 Å and 2.5-2.6 Å as proposed by Chisholm (*Canadian Mineralogist* 28(2): 329-39, 1990; *Canadian Mineralogist*, 30(1): 61-73, 1992) and Yalcin and Bozkaya (*Clays and Clay Minerals* 43(6): 705-17, 1995) have also been used to distinguish between orthorhombic and monoclinic forms of palygorskite. The peaks at 4.24 Å and 3.69 Å revealed that the palygorskite mainly has the orthorhombic crystal structure (Yalcin and Bozkaya, *Clays and Clay Minerals* 43(6): 705-17, 1995).

EXAMPLE 4

Infrared Spectroscopy (IR)

Figure 3:
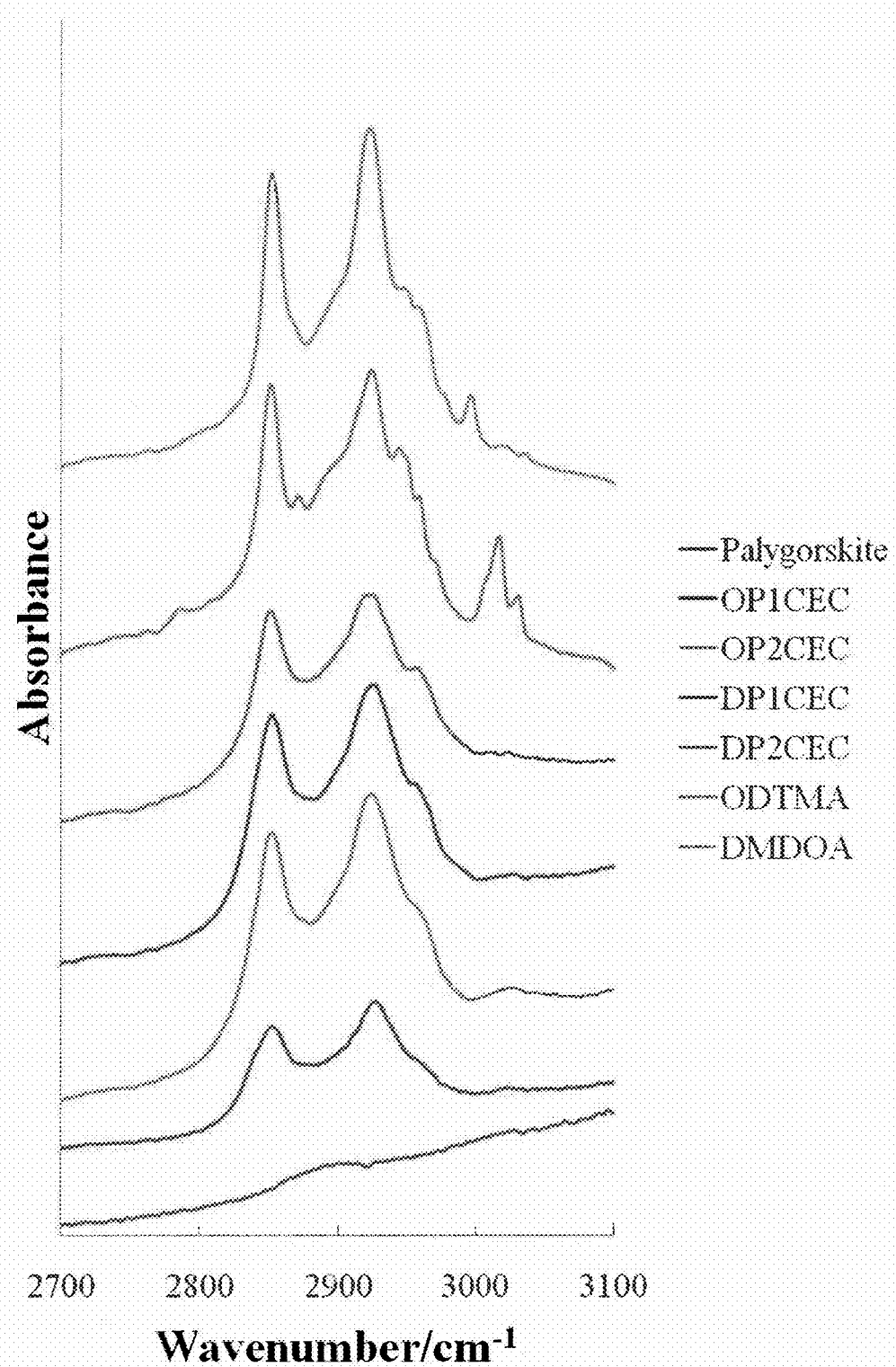
FIG. 3 shows asymmetric and symmetric stretching vibrations of $CH_2$ in surfactant modified palygorskites.
Figure 4:
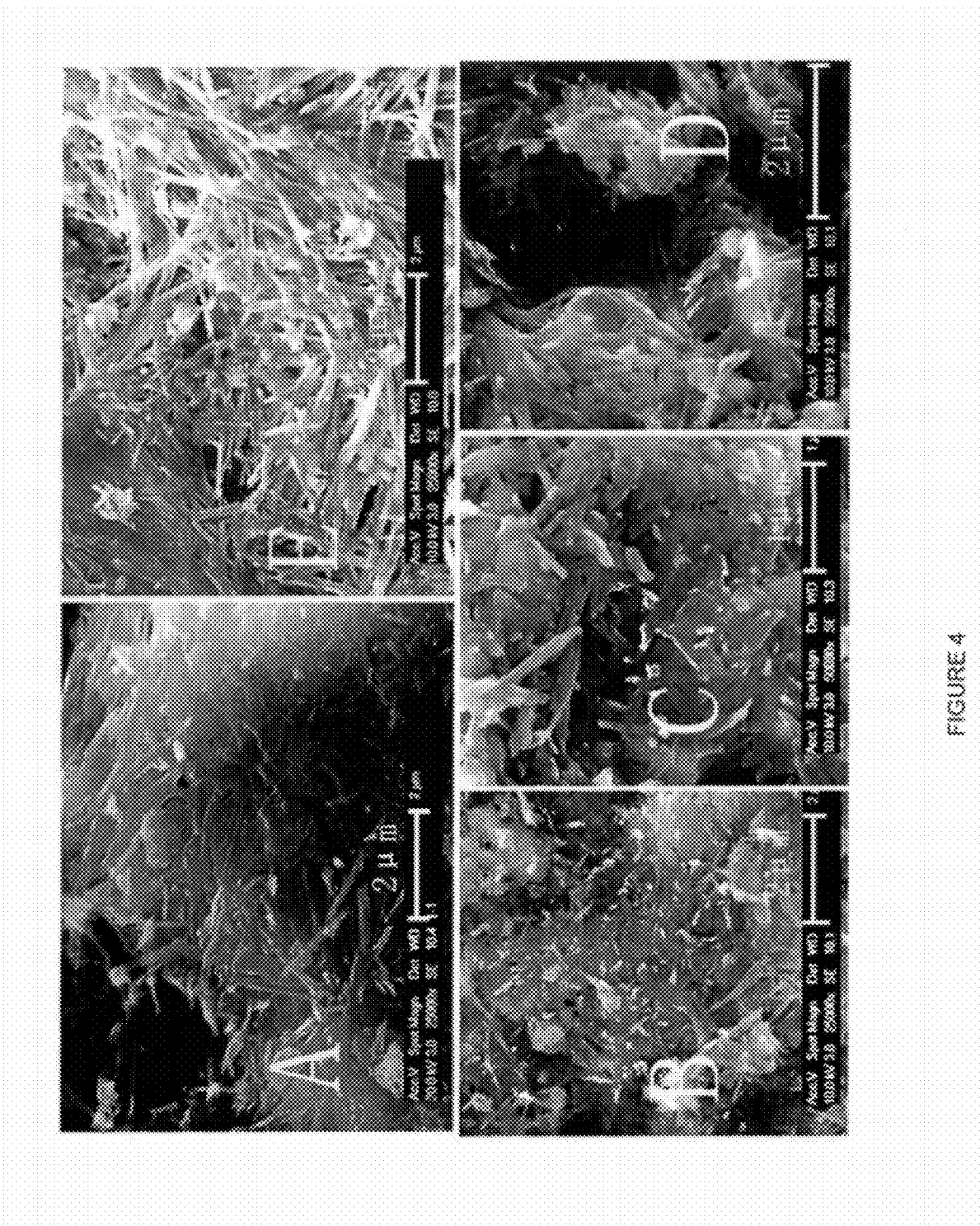
FIG. 4 shows SEM images of (a) palygorskite, (b) OP1CEC, (c) OP2CEC, (d) DP1CEC and (e) DP2CEC.

FTIR spectroscopy is a sensitive tool to probe the molecular environment of the intercalated surfactant within the modified clay sorbent. Our previous studies have proposed that the frequency of $CH_2$-stretching mode of amine chains is extremely sensitive to the conformational ordering of the chains. The bands at ~2930 and ~2850 $cm^{-1}$ are attributed to $CH_2$ antisymmetric stretching vibration, $v_{as}$ ($CH_2$) and symmetric stretching vibration, $v_s$ ($CH_2$), respectively. They are sensitive to changes in the gauche/trans conformer ratio and chain-chain interactions. For ODTMA-modified palygorskite, as the loading of surfactant increases from 1 to 2 CEC, $v_{as}$ ($CH_2$) shifts from 2928 $cm^{-1}$ for OP1CEC to 2926 $cm^{-1}$ for OP2CEC (Table 1—below). In general, the frequency of $v_{as}$ ($CH_2$) is sensitive to the gauche/trans conformer ratio and the packing density of methylene chains. Band shifts to higher wavenumber is characteristic of disorder gauche conformations, whereas band shifts to lower wavenumber is characteristic of highly ordered all-trans conformations. Generally speaking, with the increase of surfactant loading, the frequency of $v_{as}$ ($CH_2$) decreases. The frequency of $v_{as}$ ($CH_2$) in both the ODTMA modified clay sorbents is higher than that in pure surfactant which is at 2925 $cm^{-1}$. It reflects that the surfactant in the modified clay sorbents takes some disordered conformations comparing to that in pure surfactant. In case of DMDOA-modified clays (FIG. 3), the frequency decreases from 2926 $cm^{-1}$ for DP1CEC to 2924 $cm^{-1}$ for DP2CEC, while the antisymmetric stretching band has the same frequency as that of pure surfactant. At this concentration it is probable that so much surfactant is adsorbed on the surface that the value of the antisymmetric stretching vibration corresponds with that of the pure surfactant. It is to be noted here that the frequency shift of $CH_2$ stretching vibrations can be used as a guide to determine the molecular environment of the surfactant molecules in the modified clay sorbents. The higher frequencies (disorder gauche conformation) represent a liquid-like environment of surfactant while the lower frequencies represent a solid-like environment of the surfactant on palygorskite.

TABLE 1

Wavenumber shift of $CH_2$ asymmetric stretching vibration

| Sample | Wave number ($cm^{-1}$) |
|---|---|
| ODTMA | 2925 |
| OP1CEC | 2928 |
| OP2CEC | 2926 |
| DMDOA | 2924 |
| DP1CEC | 2926 |
| DP2CEC | 2924 |

EXAMPLE 5

Scanning Electron Microscopy (SEM)

Although palygorskite, also known as attapulgite, is a 2:1 type phyllosilicate clay, its structure is quite different from other layered silicates in this group. It actually lacks continuous octahedral sheets and occurs as ribbons with fibrous or threadlike structures on microscopic scale. In this study, SEM was used to examine the changes in morphology of palygorskite upon modification with different concentrations of surfactants, namely ODTMA and DMDOA.

The unmodified palygorskite (FIG. 4A) appears as flat and straight fibres that are oriented randomly and usually presented in aggregated morphology of entangled bundles and sheet-like layers of fibres. This kind of clay usually has particle diameters ranging between 50 and 300 Å, while their thickness ranges between 50 and 100 Å and the length lies between 0.2 and 5 μm. FIG. 4B to FIG. 4E show the morphology of OP1CEC, OP2CEC, DP1CEC and DP2CEC, respectively. Compared with unmodified palygorskite, fibres are prevalent and much easier to be observed in the modified clay sorbents and they also have more open pore space and less compacted mat of fibres. Likewise in FIG. 4E, it is observed that DP2CEC has fewer clusters. Since palygorskite clay is a mixture of several minerals, impurities such as fine-grained dolomite (adhered to the fibres) are also observed in some images.

EXAMPLE 6

Surface Analysis

Adsorption and desorption experiments using $N_2$ were carried out at 77K on a Gemini 2380 surface analyser. The $N_2$ isotherms have been used to calculate the specific surface area (SA) and the surface area is determined using multipoint BET method (Brunauer et al., *Journal of the American Chemical Society* 60: 309-19, 1938). It has been observed that the corresponding surface area decreases in the order: palygorskite (97.32 $m^2$)>OP1CEC (43.53 $m^2$)>DP1CEC (33.19 $m^2$)>OP2CEC (25.57 $m^2$)>DP2CEC (23.83 $m^2$). It can be noticed that with the increase of surfactant amount used to modify palygorskite, the surface area decreases and at the same level of surfactant concentrations, ODTMA modified samples have larger surface area than that of DMDOA modified products, i.e. the larger surfactant cation may produce a smaller BET surface area. It is believed that the surfactant molecules may block the surface or pores/tunnels and thus decrease BET surface area. It also depends on the surfactant arrangement on the surface of palygorskite. The ODTMA or DMDOA cations may attach to the surface and result in pore blocking that inhibits the passage of nitrogen molecules. Moreover, the long chained ODTMA or DMDOA cations pack tightly on the solid surface, forming a well structured organic phase that is available for uptake of OII molecules. It has been revealed ultimately (as will be discussed later) that the surface area determined is not a key factor in OII uptake capacity nor is it a surface specific process, rather it is governed by electrostatic attraction, partitioning or dissolution processes.

Figure 5:
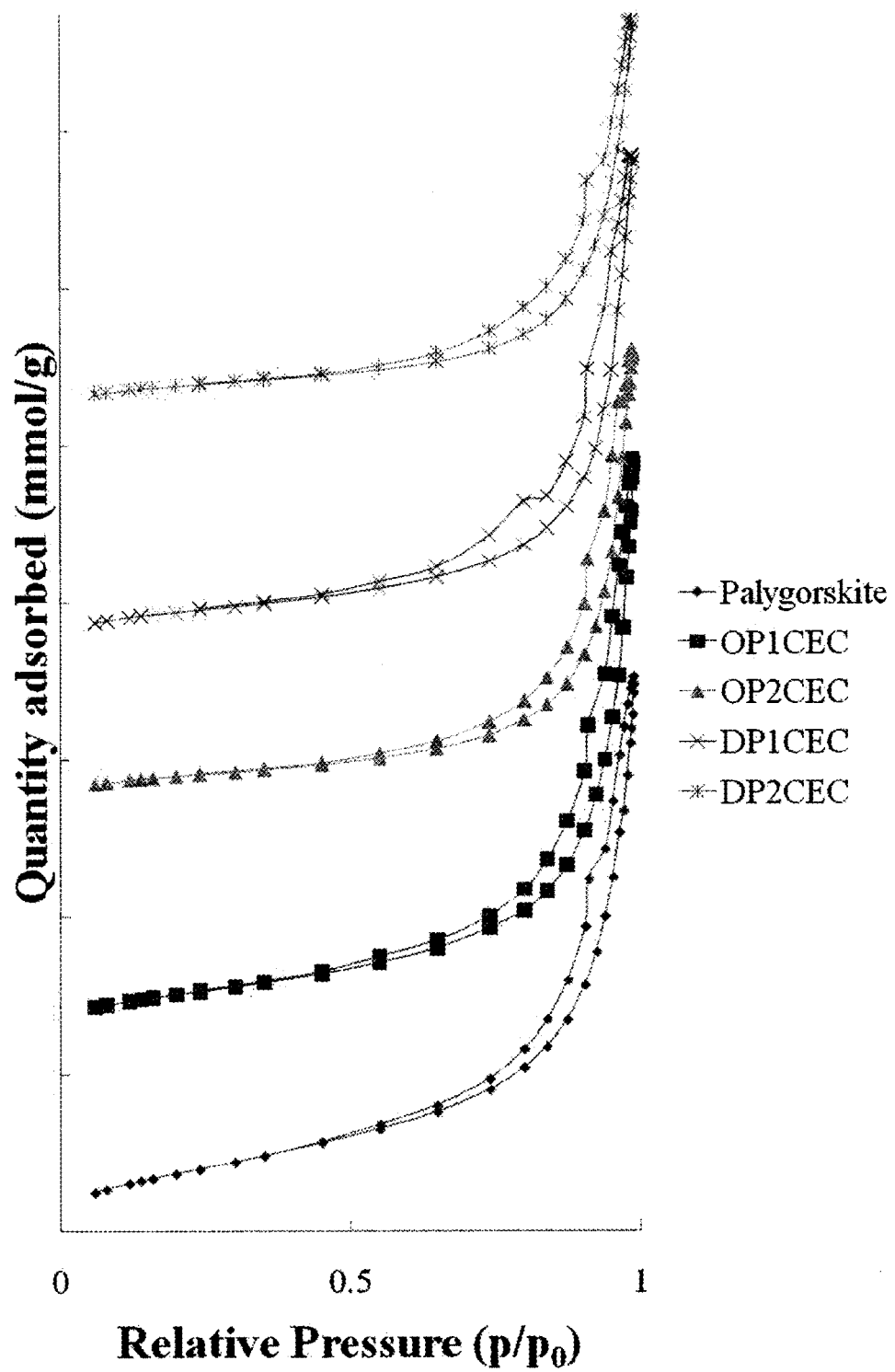
FIG. 5 shows nitrogen adsorption/desorption isotherms of palygorskite and surfactant modified palygorskites.

FIG. 5 explains the nitrogen adsorption and desorption isotherms of the modified palygorskite products. According to BDDT classification (Brunauer and Emmett, *Journal of the American Chemical Society* 62: 1732-46, 1940), nitrogen isotherms of all these materials show characteristics of type II shaped isotherms with hysteresis loops. The type II isotherm actually describes physical adsorption of gases with strong interactions by non-porous solids, usually with mixed microporous and mesoporous structures. Attachment of organic cations on clays may lead to the formation of a bidimensional porous network, namely, coexistence of micropores and mesopores. The porous structure characteristics including pore size and pore volume can be evaluated from conventional analysis of the nitrogen isotherms. The t-plot method is used for qualitative assessment of the microporosity. Untreated palygorskite has been observed having a t-plot micropore area of 18.45 m$^2$. But, the micropore area of the modified clay sorbents could not be obtained through this analysis probably because the surfactant molecules might have blocked access of N$_2$ to these micropores. Organic surfactants attached to palygorskite result in larger pore size as obtained from BJH average pore width during desorption. An average pore width of 122.1, 158.47, 180.11, 157.24 and 166.74 Å are calculated for palygorskite, OP1CEC, OP2CEC, DP1CEC and DP2CEC samples, respectively. In addition, the cumulative pore volumes for these samples are 0.26, 0.27, 0.21, 0.23 and 0.18 cm$^3$/g, respectively, which are in accordance with the sequence obtained from the average pore size.

EXAMPLE 7

Influence of Materials Amount Used on OII Adsorption

Figure 6:
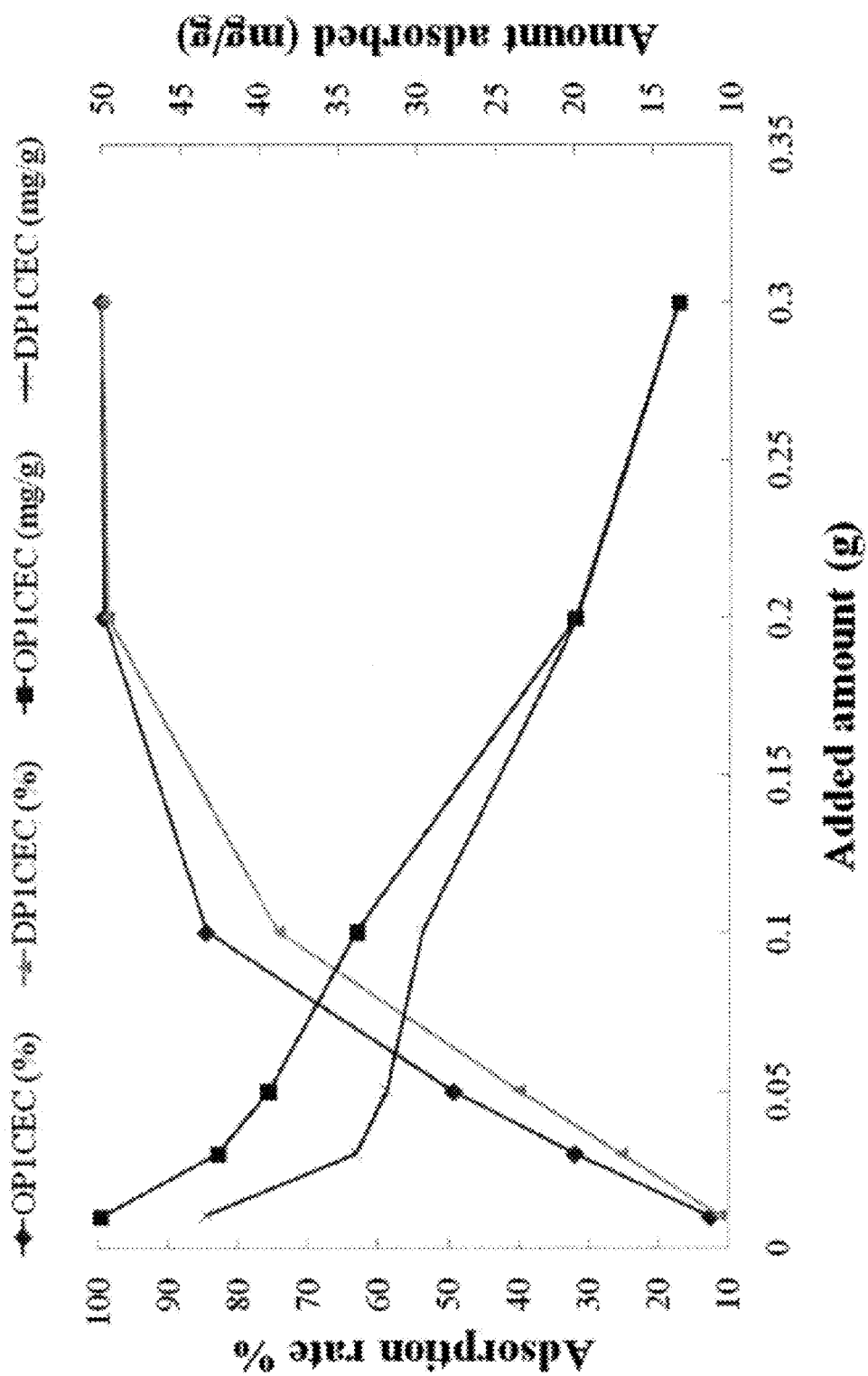
FIG. 6 shows the influence of the amount of OP1CEC and DP1CEC on OII adsorption amount and % absorption rate.
Figure 7:
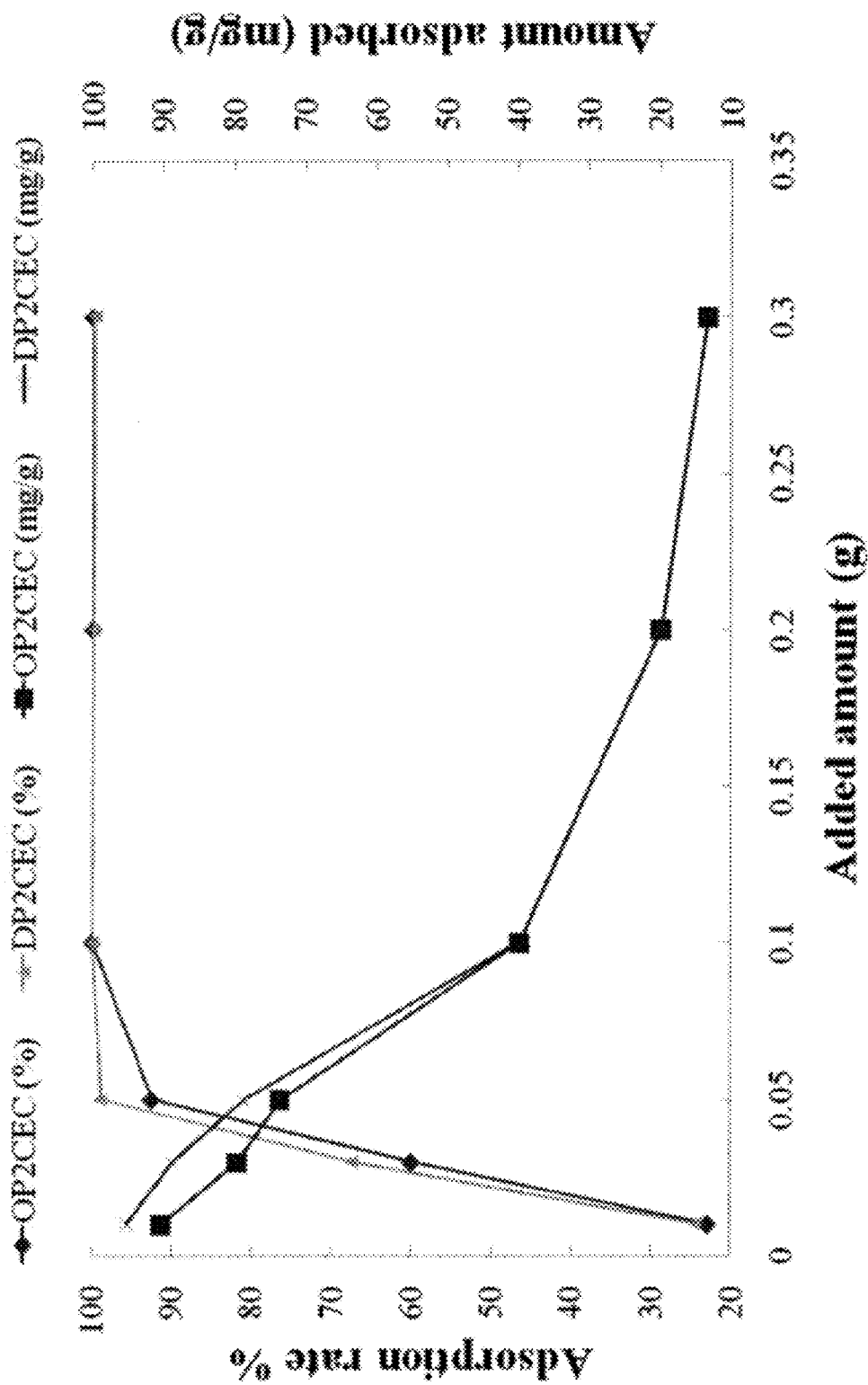
FIG. 7 shows the influence of the amount of OP2CEC and DP2CEC on OII adsorption amount and % adsorption rate.

In order to optimise the amount of modified clay sorbent required for most efficient removal of OII from an aqueous solution, a series of experiments were undertaken with varying sorbent concentrations in the reaction mixtures containing 40 mL of 100 mg/L dye solution at measured pH value of 6.13. The OII concentration has been tested after 24 hours of shaking at 25° C. The amount of OII adsorbed on the centrifuge tubes was found to be negligible. The relationship between the added sorbent amounts and the amounts of OII sorbed or adsorption rates (%) are shown in FIG. 6 and FIG. 7. It has been revealed that the dye adsorption amount decreases with increasing sorbent concentration for all of the modified clay sorbents. On the contrary, adsorption rate (%) increases with increased amount of sorbent added in all cases. Unmodified palygorskite is able to adsorb only a negligible amount of the dye (figure not shown). As shown in FIG. 6, adsorption rates of OII on 0.2 g of OP1CEC and DP1CEC can reach up to 99% and 98%, respectively, which correspond to 49.83 mg/g and 43.15 mg/g of OII when expressed as the maximum amount of OII adsorption by those two materials. Interestingly, only 0.05 g of sorbent materials is found able to reach 92.47% and 98.92% removal rates for OP2CEC and DP2CEC, respectively (FIG. 7). Thus, the optimum material amount has been decided (0.2 g for OP1CEC and DP1CEC; 0.05 g for OP2CEC and DP2CEC) for the rest of the study.

EXAMPLE 8

Influence of Mixing Time and Kinetic Study on OII Adsorption

For optimising adsorption time, at pH 6.13, a set of experiments has been performed equilibrating 40 mL of 100 mg/L OII solution with the previously decided amount of modified clay sorbent (0.2 g for OP1CEC and DP1CEC; 0.05 g for OP2CEC and DP2CEC). In addition, 0.2 g unmodified palygorskite was also tested. The suspensions were shaken at 25° C. for certain period of time (10, 20, 30, 40, 50, 60, 70, 80, 90, 120, 180 and up to 360 minutes). Then the dye concentration was measured to calculate OII adsorption amounts on the sorbents. The effect of mixing time on adsorption density shows that a negligible amount of OII can be adsorbed onto the untreated palygorskite as the contact time increases (figure not shown). A preliminary study has also confirmed that even up to 24 hours, no noticeable adsorption happens. This demonstrates that OII, which has negative sulfonate groups, is repelled by negatively charged palygorskite surface.

Figure 8:
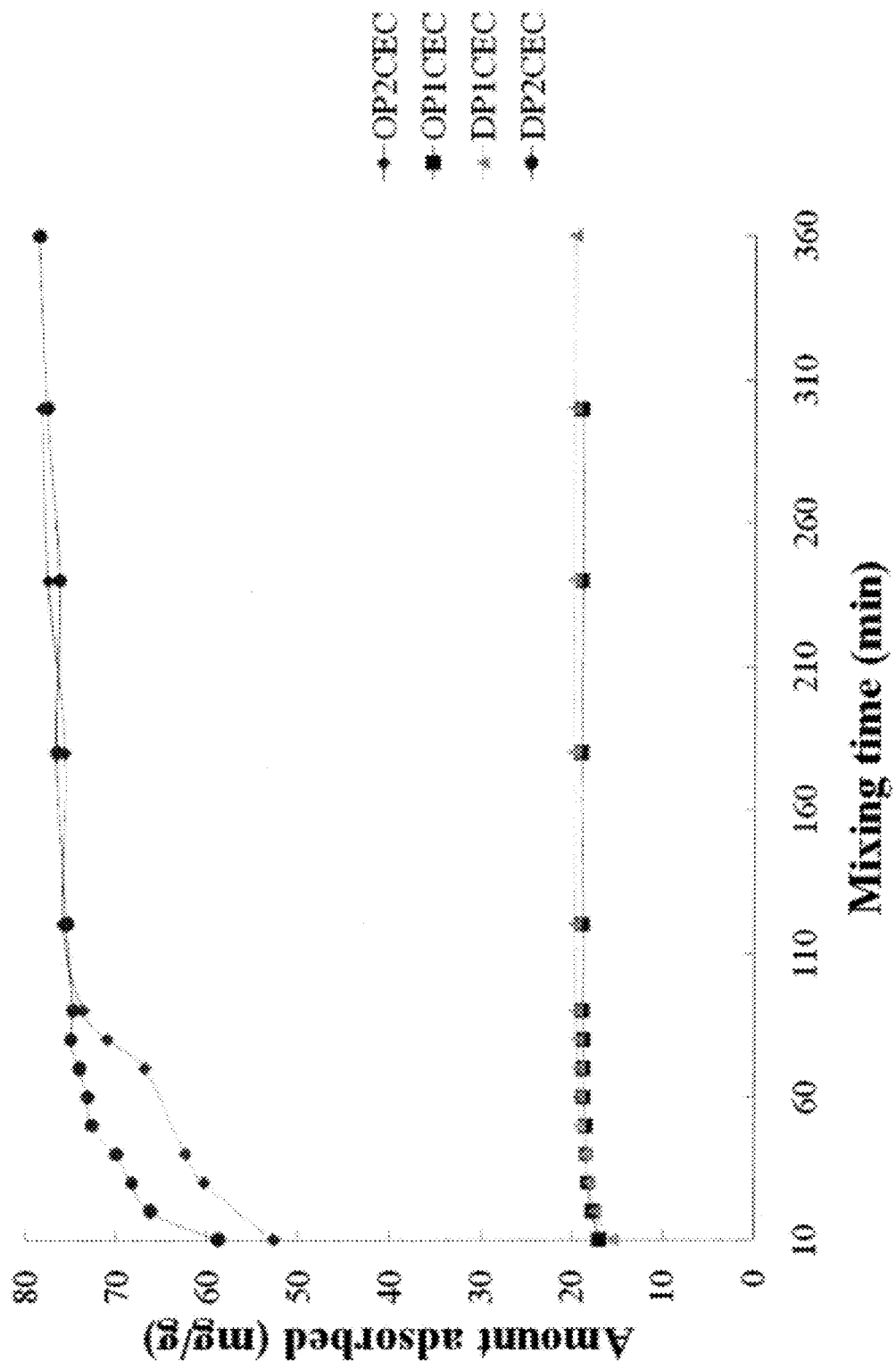
FIG. 8 shows the influence of mixing time of surfactant-modified palygorskites on OII adsorption amount.

As can be seen in FIG. 8, the amount of OII adsorbed on all four modified materials increases as the contact time progresses. In the first 30 minutes, OP1CEC can immobilise a slightly higher amount of OII than that of DP1CEC. However, adsorption behaviour of these two materials becomes similar after 30 minutes. It has been observed that the 2 CEC materials are slower in reaching equilibrium than the 1 CEC materials. Both OP2CEC and DP2CEC reach equilibrium at around 300 minutes adsorbing 69.89 mg/L and 79.47 mg/L OII, respectively. DP2CEC shows better performance than OP2CEC. In general, 2 CEC modified clay sorbents can remove more OII than that of 1 CEC modified clay sorbents. It is apparent that modification of palygorskite with ODTMA or DMDOA not only changes the hydrophobic property of the clay surface, but also neutralizes the negative charges which, if exist, can repel anionic groups present in OII. Thus, surfactant modified clay sorbents show significant improvement in adsorption capacity for OII at least in part because the modified clay sorbents may exhibit cationic charges that attract anionic groups present in the dye molecule.

Both pseudo-first-order (Chiou and Li, *Journal of Hazardous Materials* 93(2): 233-248, 2002) and pseudo-second-order (Chiou and Li, 2002, supra; Ho and McKay, *Process Biochemistry* (*Oxford*) 34(5): 451-465, 1999) models have been used to describe the kinetic data for adsorption of OII by surfactant modified palygorskites.

These models are presented linearly as:

$$\text{Ln}(q_e - q_t) = \text{Ln } q_e t \quad (1)$$

$$t/q_t = 1/(k_2 q_e^2) + t/q_e \quad (2)$$

where, $q_e$ and $q_t$ are the amount of OII sorbed at equilibrium and at time t, respectively, $k_1$ and $k_2$ are the sorption kinetic constants. The straight-line plots of $\text{Ln}(q_e - q_t)$ versus t and $t/q_t$ versus t represent the respective pseudo-first-order and pseudo-second-order kinetics for OII adsorption onto surfactant modified palygorskites and they have been examined to obtain the rate parameters. The rate constants, equilibrium OII uptake on the modified clay sorbents (both from the experiment and the calculated) and the regression coefficients ($R^2$) of both the models have been determined from the slope and intercept of the plots and are listed in Table 2 below:

TABLE 2

Kinetic parameters and regression coefficients for the adsorption of OII to surfactants modified palygorskites

| Sample | $q_{e\text{-}exp}$ (mg/g) | Pseudo-first-order | | | Pseudo-second-order | | |
|---|---|---|---|---|---|---|---|
| | | $k_1$ (min$^{-1}$) | $q_{e\text{-}cal}$ (mg/g) | $R^2$ | $k_2$ (g/mg/min) | $q_{e\text{-}cal}$ (mg/g) | $R^2$ |
| OP1 | 18.87 | 0.0171 | 1.05 | 0.8232 | 0.0399 | 18.98 | 0.9663 |
| OP2 | 78.36 | 0.0107 | 20.94 | 0.9406 | 0.0015 | 79.37 | 1 |
| DP1 | 19.85 | 0.0237 | 3.09 | 0.9613 | 0.0173 | 20.12 | 0.9992 |
| DP2 | 79.08 | 0.0107 | 14.17 | 0.8879 | 0.0024 | 79.37 | 0.9998 |

It is evident that the pseudo-first-order model has provided reasonably good fit for the modified clay sorbents, especially at early stages of mixing (usually within several tens of minutes). However, the data have shown noticeable deviation at later times. Moreover, the pseudo-first-order plots yield large differences in the theoretical and experimental values of $q_e$. On the other hand, pseudo-second-order model has shown almost perfect fit (with all $R^2 > 0.999$) in the whole range of investigated time and has good consistency between theoretical and experimental values of $q_e$. It is also found that the kinetic constants $k_1$ and $k_2$ values decrease with increasing surfactant amounts used. This result may be ascribed to the pore-blocking effect; i.e. when the amounts of ODTMA or DMDOA increase, the pore space is more densely packed, which may inhibit the migration of OII through the pores. The best fitness of pseudo-second-order kinetics for OII adsorption onto modified palygorskite suggests that chemical adsorption, rather than physical adsorption, controls the sorption rate over the whole range of OII concentrations. Also, both the adsorption process and adsorption rate of OII on the modified clay sorbents depend on the surfactant concentration at their surface.

EXAMPLE 9

Temperature Effects and Isotherm Study on OII Adsorption

Isotherms for adsorption of Orange II on the modified clay sorbents were established by equilibrating either 0.2 g (for OP1CEC and DP1CEC) or 0.05 g (for OP2CEC and DP2CEC) of sorbents with 40 mL of solution containing varying initial concentrations of the sorbate (from 5 mg/L to 200 mg/L). Equilibration was performed for 5 hours at three different temperatures; 18, 25 and 37° C. After centrifuging at 4000 rpm for 15 minutes, clear supernatant was analysed for final OII concentration using a UV-VIS Spectrophotometer at 485 nm wavelength. Likewise, adsorption isotherm for unmodified palygorskite was also carried out at using 0.2 g of the clay. It was found that unmodified palygorskite is able to hold a negligible amount of OII irrespective of the initial dye concentration. On the other hand, palygorskite, when modified with ODTMA or DMDOA, gains a distinct improvement in its affinity towards OII. This improvement is attained due to changes in the surface property of the modified clay sorbents during their modification process where the structural cations on the clay are exchanged with cationic surfactants. These surfactant cations can thus attract and electrostatically hold anionic dye molecules.

Figure 9:
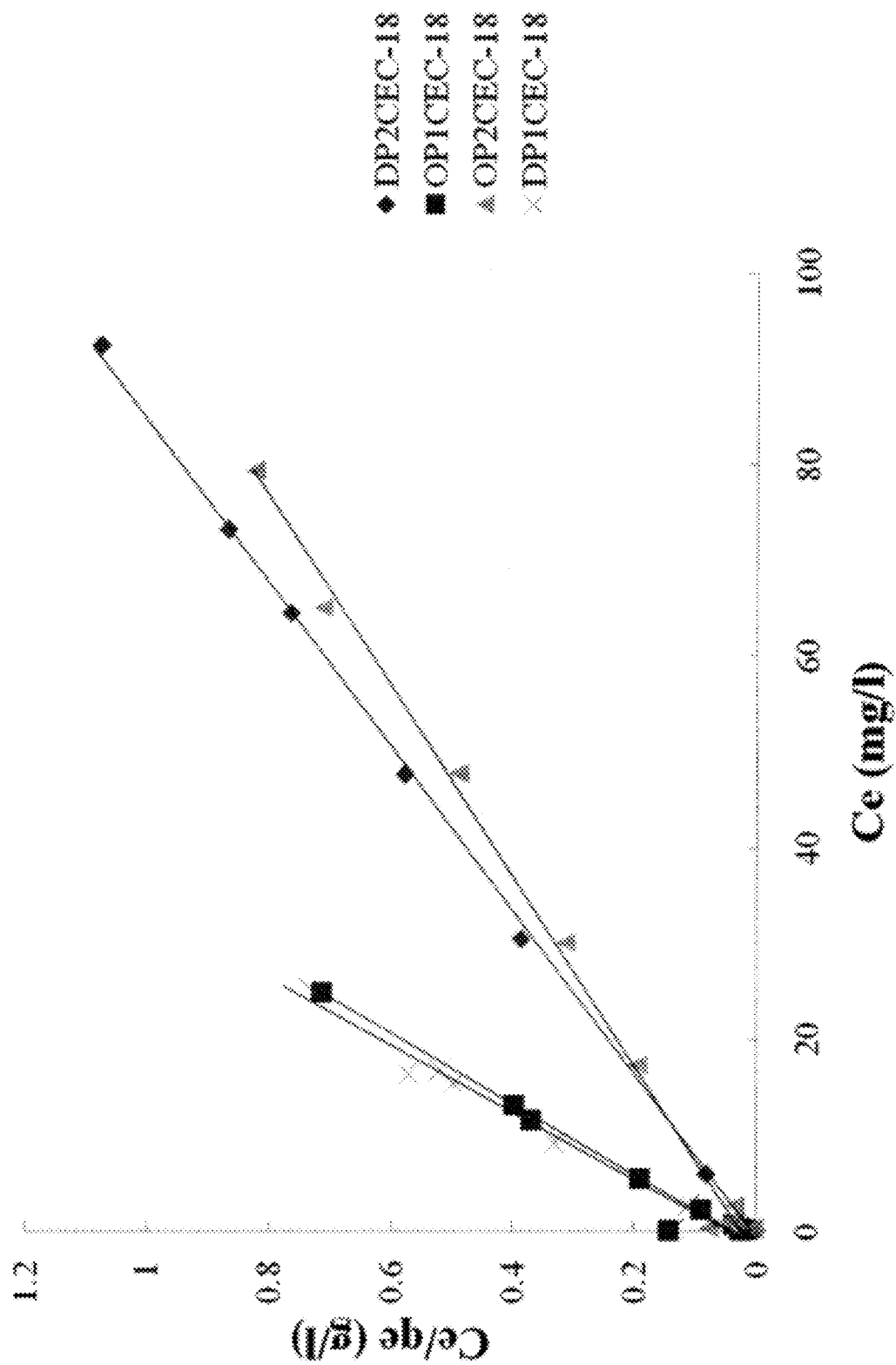
FIG. 9 shows langmuir isotherms for OII adsorption at 291K (OP1 and DP1 0.2 g; OP2 and DP2 0.05 g; initial OII 5 to 100 mg/L; pH 6.13; time 300 min).
Figure 10:
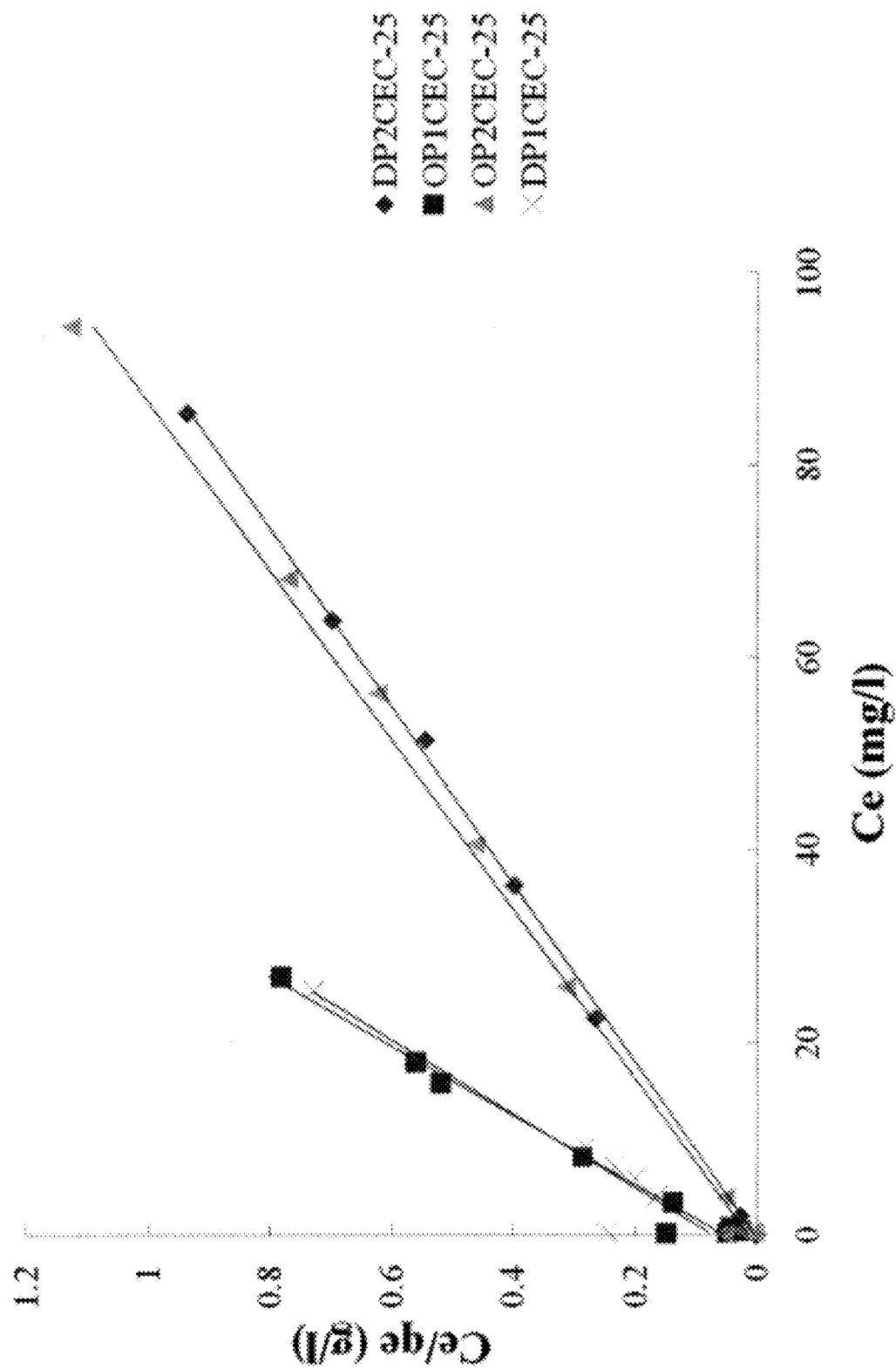
FIG. 10 shows langmuir isotherms for OII adsorption at 298K (OP1 and DP1 0.2 g; OP2 and DP2 0.05 g; initial OII 5 to 100 mg/L; pH 6.13; time 300 min).
Figure 11:
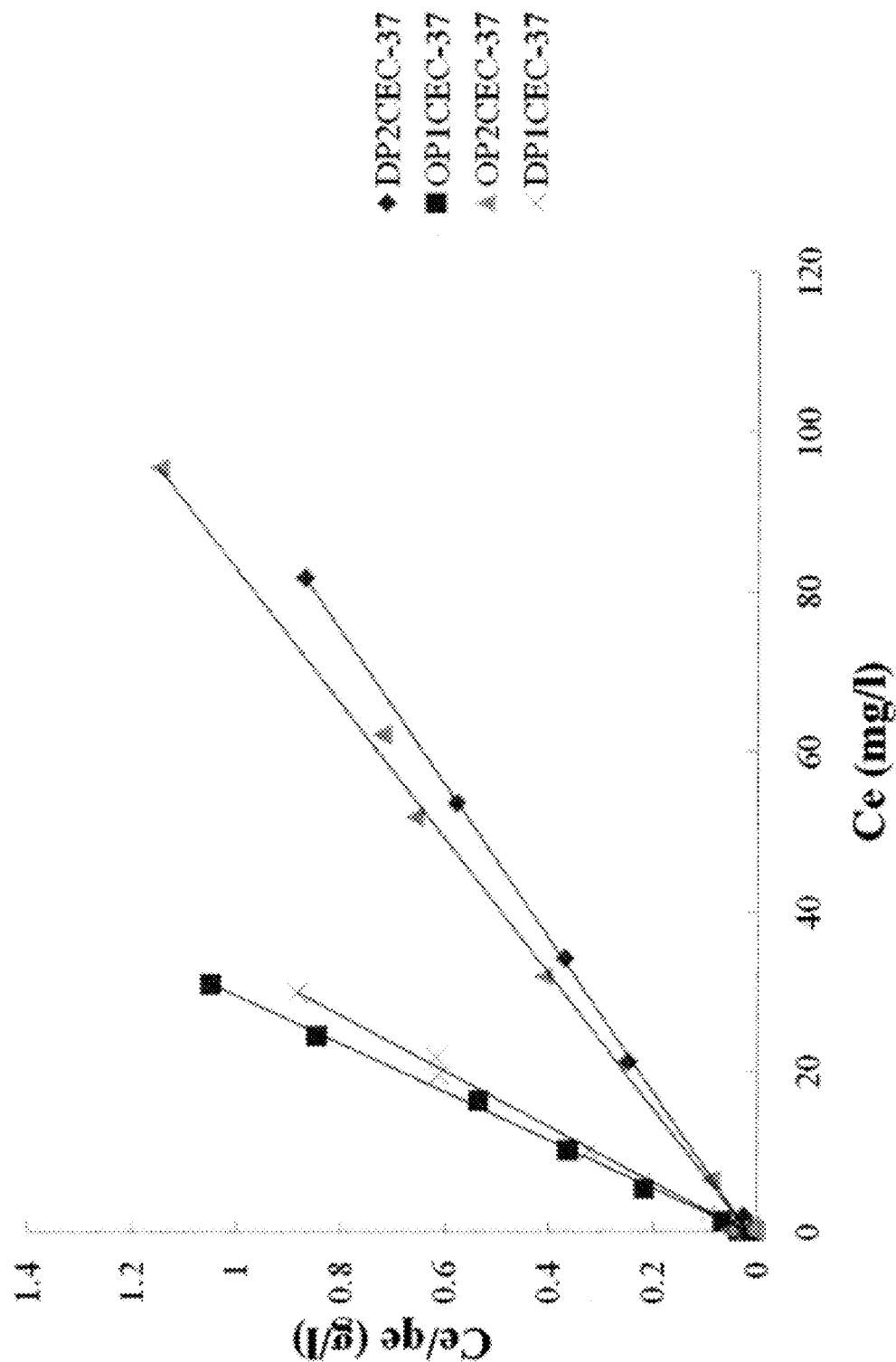
FIG. 11 shows langmuir isotherms for OII adsorption at 310K (OP1 and DP1 0.2 g; OP2 and DP2 0.05 g; initial OII 5 to 100 mg/L; pH 6.13; time 300 min).

All the data obtained from isotherm experiments for the modified clay sorbents have been optimised mathematically by fitting them to Langmuir (Langmuir, *Journal of the American Chemical Society* 40: 1361-1402, 1918) and Freundlich (Chiou and Li, *Journal of Hazardous Materials* 93(2): 233-248, 2002). isotherm models. Linear forms of these two models are given respectively by the following equations:

$$C_e/q_e = 1/(q_m b) + c_e/q_m \qquad (3)$$

$$\ln q_e = \ln K_f + \ln C_e/n \qquad (4)$$

where, $C_e$ is equilibrium OII concentration, $q_e$ is amount of OII adsorbed on adsorbent at equilibrium, $q_m$ and b are Langmuir constants related to maximum adsorption capacity (monolayer capacity of the adsorbent) and energy of adsorption (related to the free energy), respectively, while $K_f$ and $1/n$ are Freundlich constants related to adsorption capacity and intensity of adsorption (n is the heterogeneity factor), respectively. Langmuir constants, b and $q_m$ can be solved via linear regression by plotting $C_e/q_e$ versus $C_e$ (curves are shown in FIG. 9, FIG. 10 and FIG. 11). Similarly, Freundlich constants, $K_f$ and $1/n$ can be determined through linear regression by plotting $\ln(q_e)$ against $\ln(C_e)$. The value of n is usually greater than 1. In this study, adsorption isotherms are well described by the Langmuir model with correlation coefficient ($R^2$) usually exceeding 0.98 (Table 3—below). A Freundlich model generally does not fit well for the samples, except for DP2CEC at 25° C. ($R^2 = 0.85$). Langmuir fitting usually suggests strong specific interaction between the surface of the modified clay sorbents and OII with formation of a single adsorbed layer. By analysing the $q_m$ values, it is apparent that maximum adsorption capacity of OII on OP2CEC and DP2CEC at 18° C. can reach up to 99 and 85 mg/g, respectively, while OP1CEC and DP1CEC can adsorb as high as 37 and 35 mg/g, respectively. Similarly, $q_m$ values of the modified clay sorbents at 25° C. and 37° C. can be obtained (Table 3—below). It was observed that DP2CEC may adsorb the highest amount of OII at 25 and 37° C. Overall, OII adsorption capacities of OP1CEC and DP1CEC are comparable while OP2CEC and DP2CEC show similar performance with no significant temperature effect in the studied temperature range. Higher degree of fitness of the data to the Langmuir model also suggests that the adsorption is limited with monolayer coverage and the surface is energetically homogeneous with respect to adsorption energy. The features of the Langmuir isotherm can also be expressed in terms of a dimensionless constant, called separation parameter, $R_L$. It is defined by: $R_L = 1/(1 + bC_0)$, where $C_0$ is the initial OII concentration (mg/L) in the aqueous medium and b is Langmuir adsorption equilibrium constant (L/mg). In the present study, the calculated $R_L$ values (Table 3) indicate that OII adsorption on the modified clay sorbents is a favourable process ($0 < R_L < 1$).

TABLE 3

Fitted isotherms parameters and their fit to the experimental data

| Sample | Langmuir | | | | Freundlich | | |
|---|---|---|---|---|---|---|---|
| | $q_m$(mg/g) | b(L/mg) | $R^2$ | $R_L$ | $K_f$ | 1/n | $R^2$ |
| OP1-18° C. | 36.76 | 0.67 | 0.9745 | 0.0074 | 12.09 | 0.45 | 0.6509 |
| OP2-18° C. | 99.01 | 0.40 | 0.994 | 0.0124 | 27.43 | 0.34 | 0.5379 |
| DP1-18° C. | 34.84 | 0.64 | 0.9738 | 0.0078 | 12.88 | 0.33 | 0.5898 |
| DP2-18° C. | 85.47 | 1.54 | 0.9994 | 0.0032 | 35.16 | 0.23 | 0.5969 |
| OP1-25° C. | 36.10 | 0.53 | 0.9807 | 0.0094 | 10.34 | 0.46 | 0.6744 |
| OP2-25° C. | 87.72 | 0.93 | 0.9966 | 0.0054 | 30.78 | 0.27 | 0.5204 |
| DP1-25° C. | 38.61 | 0.37 | 0.9228 | 0.0133 | 9.69 | 0.52 | 0.6484 |
| DP2-25° C. | 91.74 | 4.74 | 0.9994 | 0.0011 | 32.28 | 0.30 | 0.8494 |
| OP1-37° C. | 30.12 | 1.80 | 0.9985 | 0.0028 | 12.32 | 0.34 | 0.7384 |
| OP2-37° C. | 84.03 | 0.68 | 0.9974 | 0.0073 | 30.74 | 0.26 | 0.5145 |
| DP1-37° C. | 34.84 | 1.25 | 0.9973 | 0.0040 | 11.28 | 0.41 | 0.5818 |
| DP2-37° C. | 96.15 | 0.59 | 0.998 | 0.0084 | 32.22 | 0.30 | 0.496 |

EXAMPLE 10

Influence of pH on OII Adsorption

Figure 12:
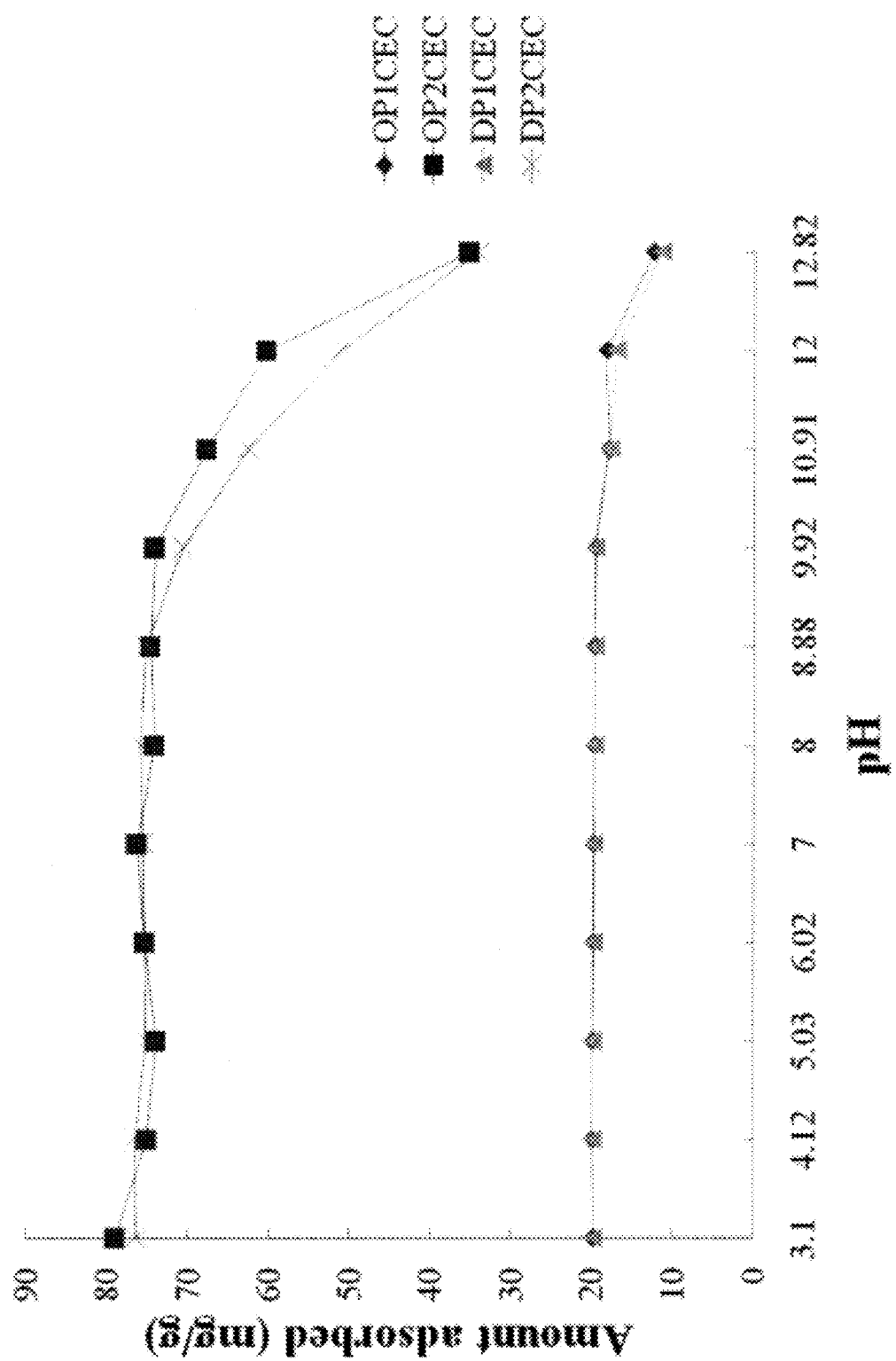
FIG. 12 shows the influence of pH on OII adsorption on surfactant-modified palygorskites.

The effect of initial pH on the adsorption of OII on the modified clay sorbents has been examined at 25° C. by equilibrating previously determined amount of sorbents with 40 mL of 100 mg/L OII solutions having pH values from 3.0 to 13.0. Initial pH values were adjusted using either dilute HCl or NaOH. It was observed that the adsorption capacity decreases with an increase of pH (FIG. 12). This variation on sorption amount with respect to pH values may be explained by the surface charge on the modified clay sorbents. As discussed earlier, a primary mechanism for OII adsorption on the modified clay sorbents is strong electrostatic interaction between the cationic surfactant head groups and the dye anions. Moreover, the surfactant molecules impart hydrophobic properties to the resulting modified clay sorbents that facilitate OII adsorption. But, there are a large number of terminal silicate tetrahedra on the ribbons that are present at the external surfaces of palygorskite. Broken Si—O—Si bonds usually compensate for their residual charge by accepting a proton or a hydroxyl and thus converts to Si—OH group. These groups may be protonated or deprotonated depending on pH values. The higher adsorption capacity of the dye onto the modified clay sorbents at low pH values may be due to neutralization of the negative charge at its surface, while at high pH, $OH^-$ groups on the surface of the modified clay sorbents may repel the anionic dye molecules. It is to be noted that in all cases 2CEC modified clay sorbents can adsorb noticeably larger amount of OII than that of 1CEC modified clay sorbents.

EXAMPLE 11

OII Desorption Study

Figure 13:
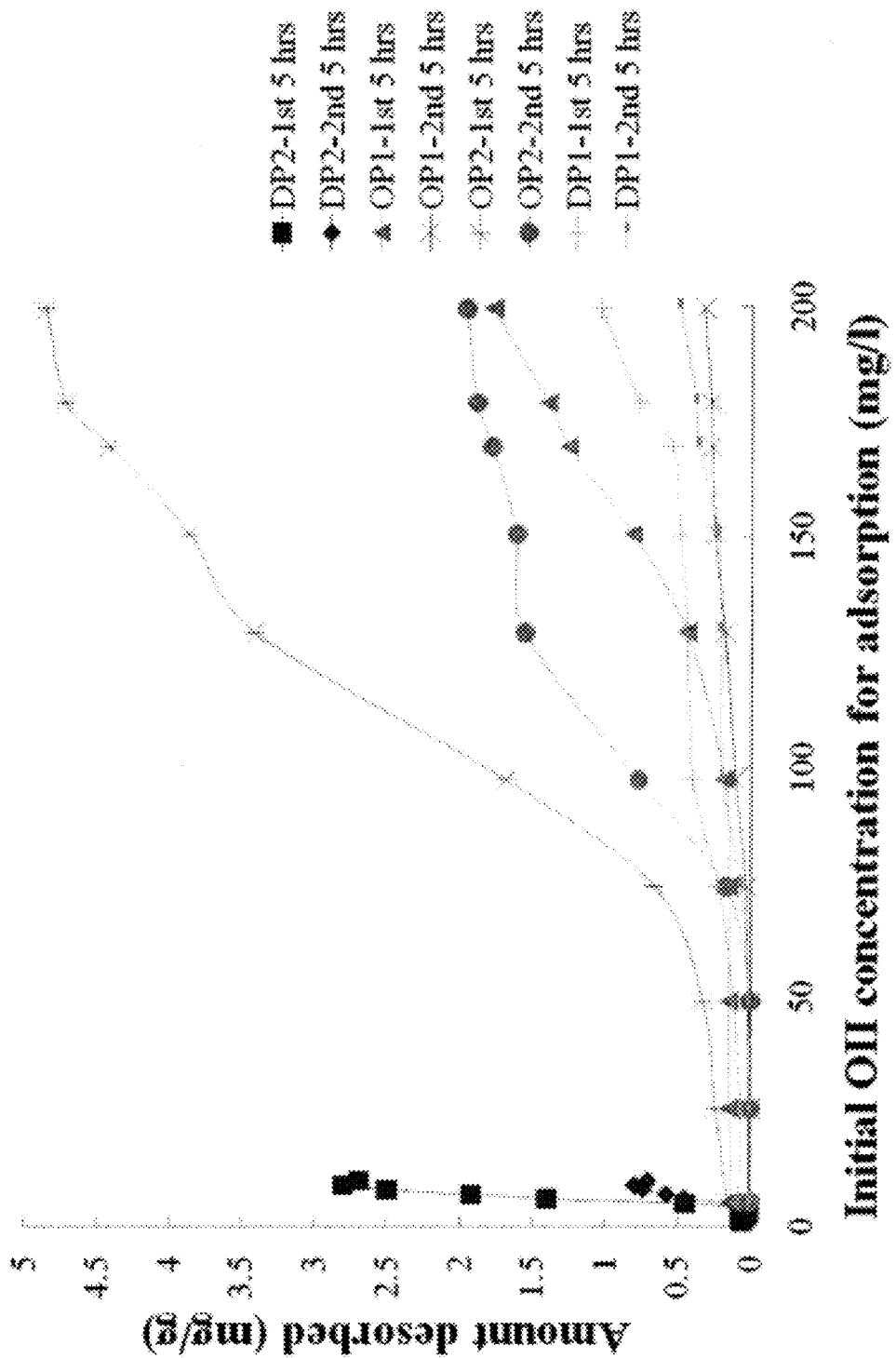
FIG. 13 shows OII desorption on surfactant-modified palygorskites.

Organically modified palygorskite sorbents will be most acceptable for application in removing dyes from environmental samples when these materials do not pose potential risk of immediate release of the dye back into the environment. To investigate this, the modified clay sorbents samples loaded with OII during the sorption isotherm experiment at 25° C. were subjected to desorption in 40 mL MilliQ water. Two consecutive five hour desorption cycles were conducted at 25° C. After each cycle of shaking, the suspension was centrifuged and the clear supernatant was analysed for desorbed OII using UV-VIS spectrophotometry. Entrapped volume was taken into consideration during calculation. The results reveal that very little OII is released from the modified clay sorbents (FIG. 13). It was also observed that at those points where adsorption is carried out with the highest initial OII concentration (200 mg/L), the amounts of dye desorbed in the first washing were in the order: OP2-$1^{st}$ 5 hours (4.86 mg/g)>DP2-$1^{st}$ 5 hours (2.8 mg/g)>OP1-$1^{st}$ 5 hours (1.78 mg/g)>DP1-$1^{st}$ 5 hours (1.03 mg/g). However, after the second washing, the sequence was in the order: OP2-$2^{nd}$ 5 hours (1.96 mg/g)>DP2-$2^{nd}$ 5 hours (0.73 mg/g)>DP1-$2^{nd}$ 5 hours (0.49 mg/g)>OP1-$2^{nd}$ 5 hours (0.32 mg/g). It was evident that 2CEC modified clay sorbents, which can adsorb more OII molecules as compared to 1CEC materials, lead to more desorption as well during two consecutive washings. And generally, DMDOA, which contains two long carbon chains, can help the palygorskite to hold OII tighter than ODTMA does. Desorption amounts in most of the cases under investigation were low, implying that physical bonding between the dye and the sorbent materials occurs only to a small extent, rather chemical bonding is largely responsible for the sorption process.

EXAMPLE 12

Conclusion—Orange II Adsorption

The adsorption of an anionic dye, orange II onto natural and modified palygorskite sorbents was investigated in detail. X-ray diffraction (XRD), scanning electron microscopy (SEM) and surface analysing were used to characterize and compare the differences between unmodified and modified palygorskites. Infrared spectroscopy confirmed the presence of surfactants on palygorskites and it was found that the frequency shift of $CH_2$ stretching vibrations can be used as a guide to determine the molecular environment of the surfactant molecules in the modified clay sorbents. It was shown that natural unmodified palygorskite is not a suitable sorbent for OII uptake due to its intrinsic negative surface charge. However, the adsorption capacities for OII can be improved significantly by modifying palygorskite with surfactants such as ODTMA and DMDOA. It was shown that the tail-tail hydrophobic interactions between OII and surfactants molecules as well as the affinity between positively charged head groups of surfactants and anionic dye molecules are the main reasons for this improvement. Investigation into the optimum process parameters for the most efficient adsorption shows that the adsorption capacity of OII onto the modified clay sorbents increases with increasing contact time, but it decreases as the sorbent amount and pH values increase. The Langmuir isotherm model was found to be the best fit for the sorption and it can be well represented by the pseudo-second-order kinetic model. In conclusion, modified palygorskites can be used as highly efficient materials for the removal of organic dyes from wastewater. Furthermore, these materials do not show significant risk of dye release back into the environment.

EXAMPLE 13

2,4-Dichlorophenoxyacetic Acid (2,4-D) Adsorption on Modified Clay Sorbents

Isotherm Study on 2,4-D Adsorption

Isotherms for adsorption of 2,4-D on modified palygorskite sorbents were established by equilibrating 0.2 g of sorbents with 40 mL of solution containing varying initial concentrations of the sorbate (from 50 mg/L to 500 mg/L). Equilibration was done for 5 hours at 25° C. After centrifuging at 4000 rpm for 15 minutes, clear supernatant was analysed for final 2,4-D concentration using a UV-VIS Spectrophotometer at 282 nm wavelength. Likewise, adsorption isotherm for unmodified palygorskite was also carried out at using 0.2 g of the clay. It was found that unmodified palygorskite is able to hold a negligible amount of 2,4-D irrespective of the initial 2,4-D concentration. On the other hand, palygorskite, when modified with ODTMA or DMDOA, gains distinct improvement in its affinity towards 2,4-D. This substantial improvement is the result of changes in the surface property of the modified palygorskite where the structural cations on the clay are exchanged with cationic surfactants. These surfactant cations attract and electrostatically hold anionic molecules.

Figure 14:
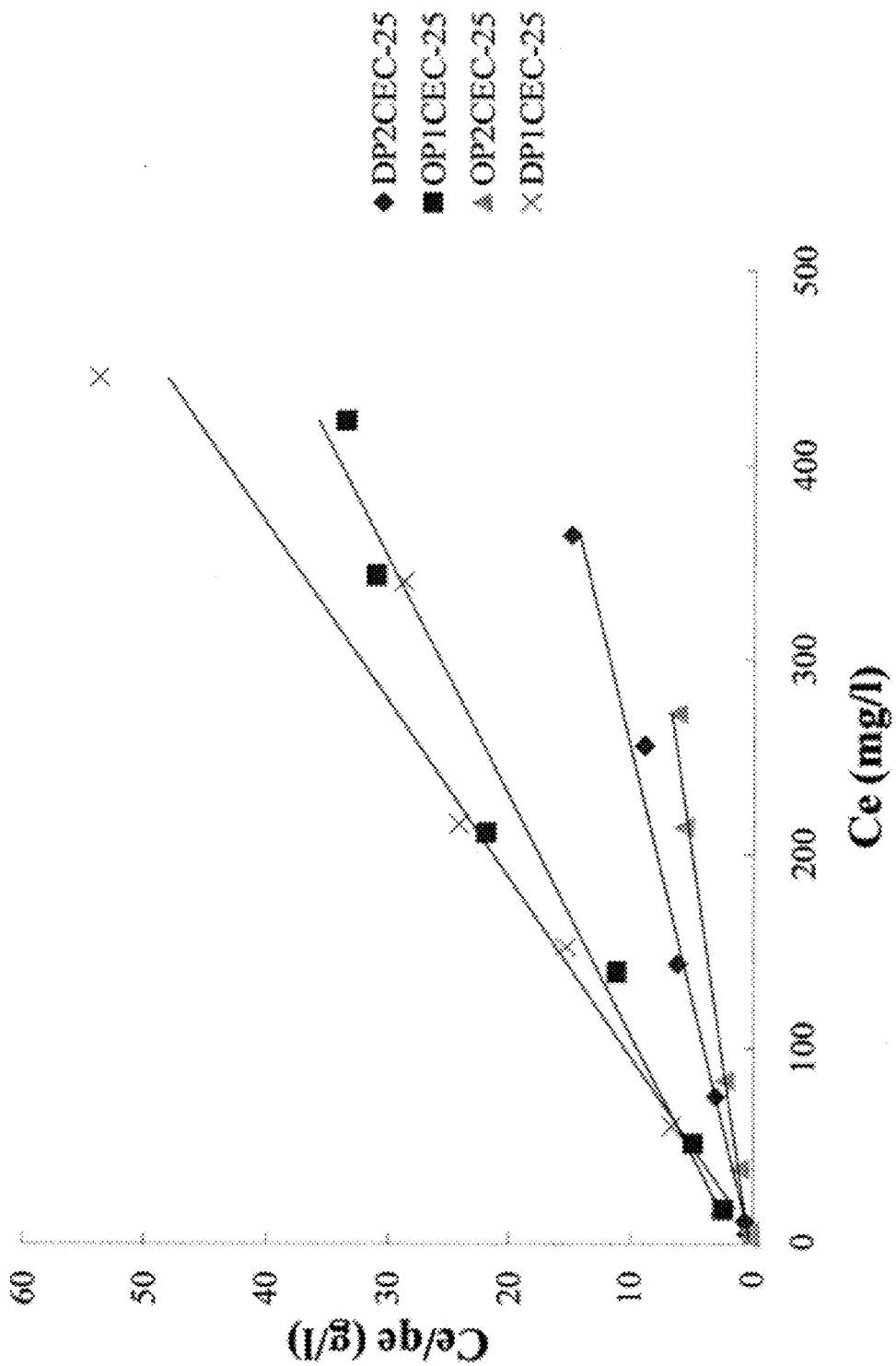
FIG. 14 shows Langmuir isotherms for 2,4-D adsorption at 298K (0.2 g sorbent; initial 2,4-D 50 to 500 mg/L; time 300 min).
Figure 15:
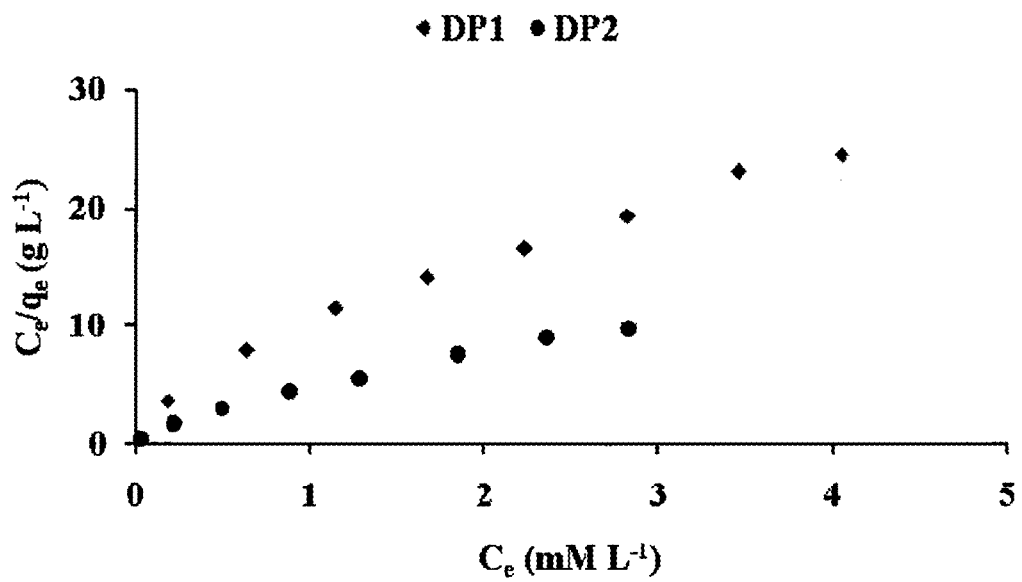
FIG. 15 shows Langmuir plots for the adsorption of PNP onto modified clay sorbents DP1 and DP2 (0.3 g sorbent, 30 mL of PNP solution, 23° C. temperature, agitation time 2 hours)
Figure 16:
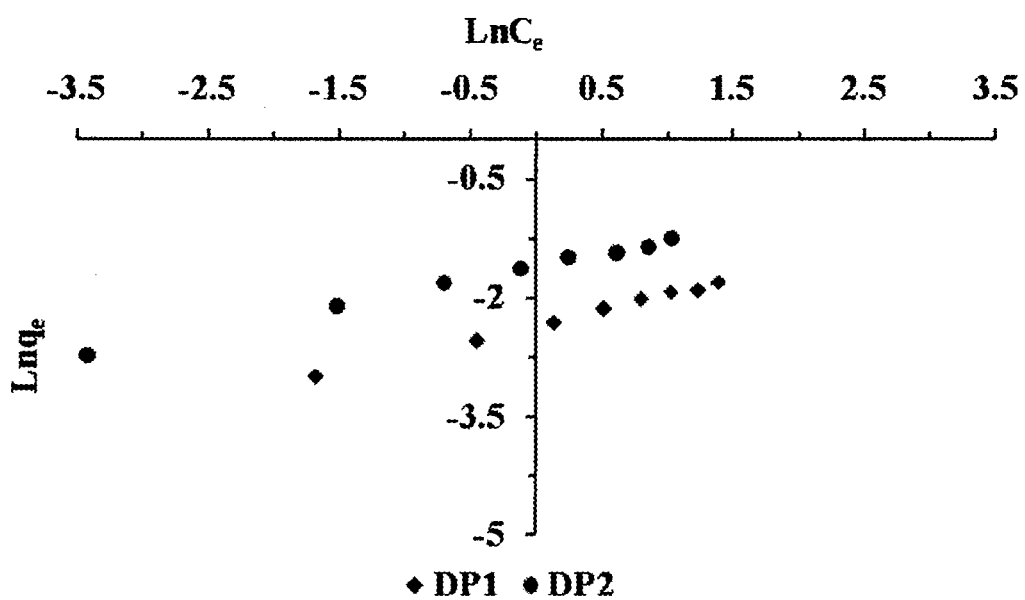
FIG. 16 shows

All the data obtained from isotherm experiments for the modified clay sorbents were optimised mathematically by fitting them to Langmuir and Freundlich isotherm models. Linear forms of these two models are given respectively by the following equations:

$$C_e/q_e = 1/(q_m b) + c_e/q_m \quad (3)$$

$$\mathrm{Ln}\, q_e = \mathrm{Ln}\, K_f + \mathrm{Ln}\, C_e/n \quad (4)$$

where, $C_e$ is equilibrium 2,4-D concentration, $q_e$ is amount of 2,4-D adsorbed on adsorbent at equilibrium, $q_m$ and b are Langmuir constants related to maximum adsorption capacity (monolayer capacity of the adsorbent) and energy of adsorption (related to the free energy), respectively, while $K_f$ and $1/n$ are Freundlich constants related to adsorption capacity and intensity of adsorption (n is the heterogeneity factor), respectively. Langmuir constants, b and $q_m$ can be solved via linear regression by plotting $C_e/q_e$ versus $C_e$ (curves are shown in FIG. 14). Similarly, Freundlich constants, $K_f$ and $1/n$ can be determined through linear regression by plotting $\mathrm{Ln}(q_e)$ against $\mathrm{Ln}(C_e)$. The value of n is usually greater than 1. In this study, adsorption isotherms were well described by the Langmuir model with correlation coefficient ($R^2$) exceeding 0.94 (see Table 4). The Freundlich model does not fit well for the samples only except OP2CEC($R^2$=0.90). Langmuir fitting usually suggests strong specific interaction between the surface of the modified clay sorbents and 2,4-D with formation of a single adsorbed layer. By analysing the $q_m$ values, it is apparent that the maximum adsorption capacity of 2,4-D on OP2CEC and DP2CEC at 25° C. can reach up to 42 and 26 mg/g, respectively, while OP1CEC and DP1CEC can adsorb as high as 12 and 9 mg/g, respectively. A higher degree of fitness of the data to the Langmuir model also suggests that the adsorption is limited with monolayer coverage and the surface is energetically homogeneous with respect to adsorption energy.

TABLE 4

Fitted isotherms parameters and their goodness of fit to the experimental data

| | Langmuir | | | Freundlich | | | |
|---|---|---|---|---|---|---|---|
| Sample | $q_m$(mg/g) | b(L/mg) | $R^2$ | $R_L$ | $K_f$ | $1/n$ | $R^2$ |
| OP1 | 12.24 | 0.06 | 0.97 | 0.033 | 5.41 | 0.14 | 0.62 |
| OP2 | 42.02 | 0.094 | 0.99 | 0.021 | 10.34 | 0.26 | 0.90 |
| DP1 | 9.14 | −0.21 | 0.94 | −0.0098 | 2.04 | 0.10 | 0.42 |
| DP2 | 25.77 | 0.23 | 0.99 | 0.0088 | 9.05 | 0.20 | 0.76 |

EXAMPLE 14

Adsorption of 4-nitrophenol by Modified Clay Sorbents 4-nitrophenol (or p-nitrophenol, abbreviated as PNP) was chosen as a model ionisable organic compound to investigate its adsorption onto modified clay sorbents. It is considerably polar in nature and has a pK value of 7.15 at 25° C.

Results—Langmuir Isotherm

It was found that adsorption of PNP onto all the organopalygorskites tested obeyed Langmuir model with a correlation coefficient ($r^2$) usually greater than 0.96 (Table 5). The corresponding F and p values have also been listed. According to this model, the maximum monolayer PNP adsorption ($q_m$) by DP1 and DP2 are calculated to be 0.190 and 0.303 mM g$^{-1}$, respectively at 23° C. These data prove that modification of palygorskite with surfactant amounts equivalent to double the CEC of the clay remarkably increases the adsorption capacities of the resulting organoclays as compared to 1CEC modified clay sorbents.

TABLE 5

Langmuir isotherm parameters for adsorption of PNP onto modified clay sorbents at 23° C. and 37° C. (0.3 g sorbent, 30 mL of PNP solution, agitation time 2 hours)

| | 23° C. | | | 37° C. | | |
|---|---|---|---|---|---|---|
| Sample | $q_m$ (mM g$^{-1}$) | K (L mM$^{-1}$) | $r^2$ | $q_m$ (mg g$^{-1}$) | K (L mM$^{-1}$) | $r^2$ |
| DP1 | 0.190 | 1.165 | 0.9809 | 0.191 | 0.984 | 0.9768 |
| DP2 | 0.303 | 2.887 | 0.9814 | 0.305 | 2.059 | 0.9646 |

Freundlich Isotherm

The results show that the organopalygorskite-PNP adsorption system is also well explained by the Freundlich model with a high degree of fitness. The values of n are greater than unity for all the sorbents and thus the adsorption system is favourable with good intensity. Also it is evident from the $K_F$ values (Table 6) that the organopalygorskites studied have high adsorption capacity for PNP. Similar to the results of Langmuir adsorption maxima, here also higher dose of surfactant modification causes huge improvement in the adsorption capacity of the organoclays.

TABLE 6

Freundlich isotherm parameters for adsorption of PNP onto organopalygorskites at 23° C. and 37° C. temperatures (0.3 g sorbent, 30 mL of PNP solution, agitation time 2 hours)

| Sample | 23° C. | | | 37° C. | | |
|---|---|---|---|---|---|---|
| | n | $K_F$ (L g$^{-1}$) | $r^2$ | n | $K_F$ (L g$^{-1}$) | $r^2$ |
| DP1 | 2.59 | 0.0954 | 0.9975 | 2.41 | 0.0892 | 0.9978 |
| DP2 | 3.05 | 0.2028 | 0.9977 | 2.92 | 0.1860 | 0.9915 |

Those skilled in the art will appreciate that the invention described herein is susceptible to variations and modifications other than those specifically described. It is to be understood that the invention includes all such variations and modifications. The invention also includes all of the steps, features, compositions and compounds referred to, or indicated in this specification, individually or collectively, and any and all combinations of any two or more of the steps or features.

Also, it must be noted that, as used herein, the singular forms "a", "an" and "the" include plural aspects unless the context already dictates otherwise.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

What is claimed is:

1. A method for separating a hydrophobic contaminant from a sample containing the hydrophobic contaminant, wherein the hydrophobic contaminant comprises a phenoxy compound, the method comprising the step of:
   contacting the sample with a modified clay sorbent under conditions suitable for sorption of the hydrophobic contaminant to the modified clay sorbent, the modified clay sorbent comprising a palygorskite clay modified with a cationic surfactant, wherein the cationic surfactant comprises a quaternary ammonium cation with two or more hydrocarbon tail groups, each of the two or more hydrocarbon tail groups comprising an octadecyl alkyl chain.

2. The method of claim 1, wherein the cationic surfactant of the modified clay sorbent is present as a surfactant monolayer or as a surfactant bilayer on at least part of the palygorskite surface.

3. The method of claim 1, wherein the cationic surfactant of the modified clay sorbent comprises a concentration equivalent to 1:1 or 2:1 of a Cation Exchange Capacity (CEC) of the palygorskite clay.

4. The method of claim 1, wherein the cationic surfactant of the modified clay sorbent comprises a dimethyldioctadecylammonium cation or a salt thereof.

5. The method of claim 4, wherein the dimethyldioctadecylammonium salt comprises dimethyldioctadecylammonium bromide.

6. The method of claim 1, wherein the conditions suitable for sorption of the hydrophobic contaminant to the modified clay sorbent comprise a pH of less than 13.

7. The method of claim 6, wherein the pH is less than 10.

8. The method of claim 1, wherein the phenoxy compound comprises 2,4-D or an ester or salt form thereof.

9. A method for separating a contaminant from a sample containing the contaminant, wherein the contaminant comprises 4-nitrophenol, the method comprising the step of:
   contacting the sample with a modified clay sorbent under conditions suitable for sorption of the contaminant to the modified clay sorbent, the modified clay sorbent comprising a palygorskite clay modified with a cationic surfactant, wherein the cationic surfactant comprises a quaternary ammonium cation with two or more hydrocarbon tail groups, each of the two or more hydrocarbon tail groups comprising an octadecyl alkyl chain.

10. The method of claim 9, wherein the cationic surfactant of the modified clay sorbent is present as a surfactant monolayer or as a surfactant bilayer on at least part of the palygorskite surface.

11. The method of claim 9, wherein the cationic surfactant of the modified clay sorbent comprises a concentration equivalent to 1:1 or 2:1 of a Cation Exchange Capacity (CEC) of the palygorskite clay.

12. The method of claim 9, wherein the cationic surfactant of the modified clay sorbent comprises a dimethyldioctadecylammonium cation or a salt thereof.

13. The method of claim 12, wherein the dimethyldioctadecylammonium salt comprises dimethyldioctadecylammonium bromide.

14. The method of claim 9, wherein the conditions suitable for sorption of the hydrophobic contaminant to the modified clay sorbent comprise a pH of less than 13.

15. The method of claim 14, wherein the pH is less than 10.

* * * * *

UNITED STATES PATENT AND TRADEMARK OFFICE
CERTIFICATE OF CORRECTION

| | | |
|---|---|---|
| PATENT NO. | : 9,199,184 B2 | Page 1 of 1 |
| APPLICATION NO. | : 13/157054 | |
| DATED | : December 1, 2015 | |
| INVENTOR(S) | : Megharaj Mallavarapu et al. | |

It is certified that error appears in the above-identified patent and that said Letters Patent is hereby corrected as shown below:

On the Title Page:
Under (75) Inventors: Delete "Paralowle" and replace with -- Paralowie --

In the Specification:
Column 10, line 5: Delete "n-delocalization," and replace with -- Π–delocalization, --

Signed and Sealed this
Fifth Day of April, 2016

Michelle K. Lee
*Director of the United States Patent and Trademark Office*